(12) United States Patent
Hirose et al.

(10) Patent No.: US 10,981,057 B2
(45) Date of Patent: Apr. 20, 2021

(54) GAME PROGRAM, INFORMATION PROCESSING APPARATUS, INFORMATION PROCESSING SYSTEM, AND GAME PROCESSING METHOD

(71) Applicant: NINTENDO CO., LTD., Kyoto (JP)

(72) Inventors: Miyuki Hirose, Kyoto (JP); Tsutomu Komiyama, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 244 days.

(21) Appl. No.: 16/121,813

(22) Filed: Sep. 5, 2018

(65) Prior Publication Data

US 2019/0070502 A1 Mar. 7, 2019

(30) Foreign Application Priority Data

Sep. 7, 2017 (JP) .............................. JP2017-171882

(51) Int. Cl.
*A63F 13/47* (2014.01)
*A63F 13/48* (2014.01)
*A63F 13/79* (2014.01)

(52) U.S. Cl.
CPC .............. *A63F 13/47* (2014.09); *A63F 13/48* (2014.09); *A63F 13/79* (2014.09); *A63F 2300/5553* (2013.01); *A63F 2300/6036* (2013.01)

(58) Field of Classification Search
CPC .......... A63F 13/47; A63F 13/48; A63F 13/79; A63F 13/45; A63F 2300/5563; A63F 2300/6063
See application file for complete search history.

(56) References Cited

U.S. PATENT DOCUMENTS

2005/0192097 A1* 9/2005 Farnham ............... A63F 13/795
463/42
2009/0075738 A1* 3/2009 Pearce .................... G07F 17/32
463/42

OTHER PUBLICATIONS

"Connect and Compete with racers from around the world", https://www.nintendo.co.jp/wiiu/amkj/network/index.html (Japanese) screenshots (13 pages) https://mariokart8.nintendo.com/wiiu/onlineplay/(English) screenshots (14 pages), Apr. 30, 2014.
Office Action dated Dec. 7, 2020 in Japanese Patent Application No. 2017-171882, 9 pages.
With someone/Okiraku Brawl, Smash Bros. Fist!! [online], Dec. 7, 2007, searched on Nov. 27, 2020, URL, https://www.smashbros.com/wii/jp/gamemode/wi-fi/wi-fi04.html, 5 pages.

(Continued)

*Primary Examiner* — Kang Hu
*Assistant Examiner* — Thomas H Henry
(74) *Attorney, Agent, or Firm* — Xsensus LLP

(57) ABSTRACT

An example information processing apparatus executes a setting process of setting a content set including a plurality of game contents for a player of the information processing apparatus. The information processing apparatus executes a selection process of selecting at least one game content from the content set. A game content is chosen, according to a predetermine rule, from a game content group including a plurality of game contents selected by performing the selection process on each of content sets that have been set for a plurality of players. A game process based on the chosen game content is executed.

18 Claims, 13 Drawing Sheets

(56) References Cited

OTHER PUBLICATIONS

Mario Brothers, Smash Bros. Fist!! [online], Feb. 12, 2008, searched on Nov. 27, 2020, URL, https://www.smashbros.com/wii/jp/stages/stage26.html, 3 pages.
Mariokart 8, Dengeki Nintendo vol. 14, No. 9, Kadokawa Co., Ltd., Jun. 21, 2014, P86, 7 pages.

* cited by examiner

GAME PROGRAM, INFORMATION PROCESSING APPARATUS, INFORMATION PROCESSING SYSTEM, AND GAME PROCESSING METHOD

CROSS REFERENCE TO RELATED APPLICATION

The disclosure of Japanese Patent Application No. 2017-171882, filed Sep. 7, 2017, is incorporated herein by reference.

FIELD

The technology disclosed herein relates to storage media storing game programs for executing a game process based on a game content selected from a plurality of game contents, information processing apparatuses, information processing systems, and game processing methods.

BACKGROUND AND SUMMARY

Among conventional racing games in which a plurality of players can participate simultaneously is one in which a racing course that is to be actually used is randomly selected from a plurality of previously prepared racing courses. For example, a predetermined number of racing courses randomly selected from a plurality of previously prepared racing courses are presented to players. Each player selects one from the presented racing courses. A racing course that is to be actually used in the game is randomly selected from the racing courses selected by the players.

The same optional racing courses are conventionally presented to all the players. Each player selects one from the options common to all the players. Therefore, there are almost no tactics for selecting a racing course.

With the above in mind, the present application discloses a storage medium storing a game program that has improved strategic aspects of a game involved in selecting a game content for use in the game, an information processing apparatus, an information processing system, and a game processing method.

(1) A non-limiting example storage medium according to the present disclosure stores a game program for causing a computer of an information processing apparatus to function as a set setting means, a content selecting means, a content choosing means, and a game executing means. The set setting means executes a setting process of setting a content set including a plurality of game contents for a player of the information processing apparatus. The plurality of game contents may be different from each other in at least one of game rule, game condition, and game stage. The content selecting means executes a selection process of selecting at least one game content from the content set. The content choosing means chooses, according to a predetermined rule, a game content from a game content group including a plurality of game contents selected by performing the selection process on each of content sets that have been set for a plurality of players. The game executing means executes a game process based on the chosen game content.

According to the feature (1), a game content is selected from a content set, a game content is chosen from those that have been selected for a plurality of players, and a game process based on the chosen game content is executed. According to the feature (1), different content sets can be set for different players (note that two or more content sets may be accidentally the same). Therefore, when operations such as setting a content set and selecting a game content from a content set are performed, a player can consider or guess what kinds of a content set has been selected by another player. Therefore, there are tactics for performing the above operations, so that the strategic aspects of the game involving in selecting a game content for use in the game can be improved. In addition, according to the feature (1), in a game in which a plurality of game contents are prepared that are different from each other in at least one of game rule, game condition, and game stage, the strategic aspects of the game involving in selecting a game content for use in the game can be improved.

(2) A series of processes including the selection process, the process of choosing a game content, and the game process based on the chosen game content may be repeatedly executed as gameplay proceeds during a round of gameplay. The game program may cause the computer to further function as a set changing means. The set changing means changes a game content included in at least one of the plurality of content sets, depending on proceeding of gameplay during a round of gameplay.

According to the feature (2), the contents of a content set are changed, depending on proceeding of gameplay. This allows a player to perform the above operations in gameplay, taking the changed contents of the content set into account, and therefore, the strategic aspects of the game can be further improved.

(3) The set changing means may exclude a game content from the content set in the selection process, if one or more conditions including one that the game content has been chosen are satisfied.

According to the feature (3), a game content that has actually been played is excluded from the content set. Therefore, the possibility that the same game content is played a plurality of times in a round of gameplay can be reduced, and therefore, the possibility that a player gets bored with the game can be reduced.

(4) The set changing means may exclude the chosen game content, in the selection process, from the content set from which the chosen game content has been selected, and may not exclude the chosen game content from the other content sets.

According to the feature (4), even a game content that has actually been played is not excluded in the selection process from a game content from which the game content has not been selected. Therefore, the possibility that a player complains about the game because a game content that has not been selected is excluded from the content set, can be reduced.

(5) The set changing means may exclude a game content from a content set in the selection process, if one or more conditions including one that the game content has been selected in the selection process are satisfied.

According to the feature (5), a game content that has been selected in the selection process and has not been played can be prevented from being selected again in the subsequent selection process. As a result, the possibility that tactics for selecting game content are reduced can be reduced.

(6) The set changing means may exclude a game content that has been selected in the selection process, in the selection process, from a content set from which the game content has been selected, and may not exclude the game content from the other content sets in the selection process.

According to the feature (6), even a game content that has been selected in the selection process is not excluded in the selection process from a game content from which the game content has not been selected. Therefore, the possibility that a player complains about the game because a game content that has not been selected is excluded from the content set, can be reduced.

(7) The content selecting means may select at least one game content from a content set in the selection process, according to an instruction from a player corresponding to the content set.

According to the feature (7), a player can specify a portion of the game content group for choosing a game content to be played, by themselves. This allows a player to specify a game content, taking into account whether a game content which the player is good at (or a game content which another player is bad at) should be specified at the current time, or saved for the next time, etc. As a result, the strategic aspects of the game involved in choosing a game content to be executed can be improved, resulting in an improvement in the amusingness of the game.

(8) The set setting means may set a content set specified by a player from a plurality of previously prepared content sets, as a content set for the player.

According to the feature (8), none of the players needs to select a game content that is to be included in a content set, on a one-by-one basis, i.e., a player can easily set a content set.

(9) The game program may cause the computer to further function as a set creating means. The set creating means creates a content set including a plurality of game contents specified by a player from a plurality of previously prepared game contents. The set setting means may set a content set including a plurality of game contents specified by a player, as a content set for the player.

According to the feature (9), a player can freely set the contents of a content set. For example, a player can set a content set including only their favorite game contents.

(10) The game program may cause the computer to further function as a set creating means. The set creating means receive an instruction to automatically create a content set, from a player, and creates a content set including a plurality of game contents automatically selected from a plurality of previously prepared game contents according to the instruction. The set setting means may set a content set including a plurality of game contents automatically selected according to a player's instruction, as a content set for the player.

According to the feature (10), the contents of a content set are automatically set according to a player's instruction. Therefore, a player can easily set a content set.

(11) A series of processes including the selection process, the process of choosing a game content, and the game process based on the chosen game content may be repeatedly executed during a round of gameplay. The game program may cause the computer to further function as a registration receiving means and a set creating means. The registration receiving means receives a registration instruction to register a game content that has been executed in the gameplay, at a predetermined timing during the round of gameplay. The set creating means newly creates a content set including a game content for which the registration instruction has been input. The set setting means may set the created content set as a content set for the player who has input the registered instruction.

According to the feature (11), a player can register a game content that has actually been played, and thereby set a content set including the registered game content. For example, a player can register a favorite game content, and thereby set a content set including the favorite game content. In addition, according to the feature (11), a player can input an instruction to register a game content in gameplay, and therefore, can more easily input the registration instruction.

(12) The content choosing means may choose a game content from the game content group in a probabilistic manner.

According to the feature (12), a game content is chosen from the game content group substantially randomly. If none of the players is allowed to exactly guess a game content that is to be chosen, the amusingness of the game can be improved in terms of choice of a game content.

(13) If two or more of the same game content are included in the game content group, the content choosing means may choose that game content with a higher probability than when that game content is singly included in the game content group.

According to the feature (13), the probability with which a game content is chosen varies depending on whether or not the game content group includes two or more of that game content. Therefore, a player selects a game content, taking into account the possibility that the player selects the same content set that is selected by another player. Therefore, the strategic aspects of the game involved in selecting a game content can be improved.

(14) The content choosing means may adjust a probability with which a game content included in a content set of a player who satisfies a predetermined condition, of a plurality of players, is chosen such that the probability is higher than a probability with which a game content included in a content set of a player who does not satisfy a predetermined condition is chosen.

According to the feature (14), the probability with which a game content is chosen varies depending on whether or not the player corresponding to the game content satisfies a predetermined condition. Therefore, a player plays the game, taking into account which of the players satisfies a predetermined condition. As a result, the strategic aspects of the game can be improved.

(15) The predetermined condition may be for starting a series of processes including the selection process, the process of choosing a game content, and the game process based on the chosen game content during a round of gameplay. In the case where the series of process is executed if the predetermined condition is satisfied, the content choosing means may adjust a probability with which a game content included in a content set of a player who satisfies the predetermined condition is chosen such that the probability is higher than a probability with which a game content included in a content set of a player who does not satisfy the predetermined condition is chosen, in the series of processes.

According to the feature (15), a game content corresponding to a player who satisfies the condition for starting the series of processes is more likely to be chosen, and therefore, a player can be motivated to satisfy the condition. Therefore, the execution of the series of processes are more readily initiated, so that the game can proceed more smoothly.

(16) The game program may cause the computer to further function as a display control means. The display control means displays, on a display device, an image indicating regions associated with the respective game contents included in the game content group. The area of each region represents a probability with which the corresponding game content is chosen.

According to the feature (16), a player can intuitively recognize a probability with which a game content is chosen, based on the area of the corresponding region in the image.

(17) The game program may cause the computer to further function as a prize giving means. The prize giving means gives a prize in the game to a player, depending on the result of the game process based on the chosen game content. In the case where a predetermined prize depending on the result is given to a player, the prize giving means may give a greater prize to a player when the chosen game content is from a content set of the player than when the chosen game content is not from a content set of the player.

According to the feature (17), a player can get a greater prize when the chosen game content is from their own content set than when the chosen game content is not from their own content set. As a result, a player pays more attention to whether or not a game content selected from their own content set is chosen. Therefore, the strategic aspects and amusingness of the game can be further improved.

(18) The game program may cause the computer to further function as a set presenting means. The set presenting means presents, to a player, a set image indicating game contents included in a content set corresponding to another player.

According to the feature (18), a player can play the game, taking into account the contents of a content set that has been set for another player.

(19) The game program may cause the computer to further function as a display control means for displaying a game image on a display device. The display control means may not present, to a player, an image the game contents of a content set corresponding to another player, during a round of gameplay in which a series of processes including the selection process, the process of choosing a game content, and the game process based on the chosen game content is executed.

According to the feature (19), in gameplay, none of the players can exactly know the contents of a content set that has been set for another player, and a player only guesses the contents of a content set that has been set for another player. Therefore, the strategic aspects of the game can be improved.

Note that non-limiting example information processing apparatuses or information processing systems including the means described in (1)-(19) are herein disclosed. In addition, non-limiting example game processing methods executed in the information processing apparatus (or the information processing system) described in (1)-(19) are herein disclosed.

According to the storage medium storing the game program, the information processing apparatus, the information processing system, and the game processing method, the strategic aspects of a game involved in selecting a game content for use in the game can be improved.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

[1. Configurations of Information Processing System and Information Processing Apparatus]

Figure 1:
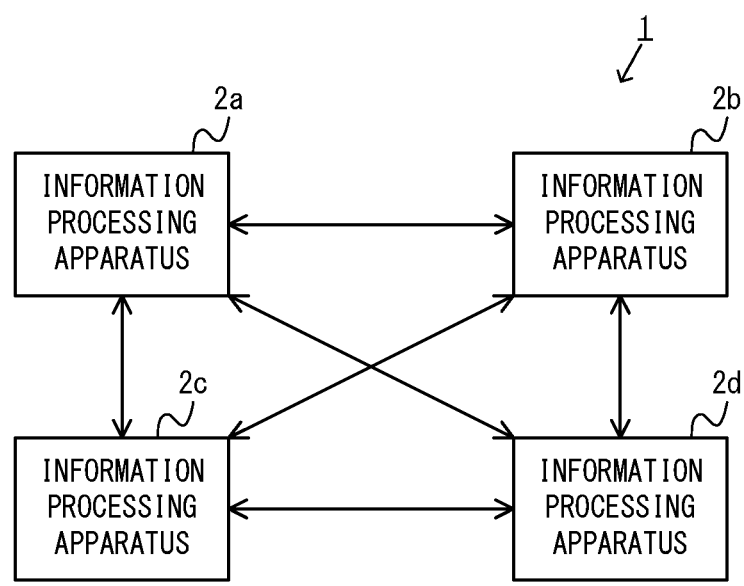
FIG. 1 is a diagram showing a non-limiting example information processing system according to this non-limiting example embodiment.

An information processing system, information processing apparatus, game program, and game processing method according to this non-limiting example embodiment will now be described. FIG. 1 is a diagram showing an example information processing system according to this non-limiting example embodiment. As shown in FIG. 1, in this non-limiting example embodiment, an information processing system 1 includes a plurality of (here, four) information processing apparatuses 2a-2d. Note that in the description that follows, unless the information processing apparatuses 2a-2d are distinguished from each other, the information processing apparatuses 2a-2d may be collectively referred to as the "information processing apparatuses 2."

As shown in FIG. 1, the information processing apparatuses 2 can communicate with each other. The communication between each information processing apparatus 2 is performed using any suitable communication technology. The information processing apparatuses 2 may communicate with each other directly, via a network, such as a LAN or the Internet, or via a server. The information processing apparatuses 2 may communicate with each other, the network, and/or the server in either a wired or wireless manner.

As described in detail below, in the information processing system 1 of this non-limiting example embodiment, a multiplayer game is played. Specifically, the game is played by multiple players (i.e., users) each using an information processing apparatus 2. Note that in another non-limiting example embodiment, an information processing system may include only one information processing apparatus 2, which may be used by multiple players to play the game. Alternatively, the multiplayer game may be actually played by a single player. Specifically, the multiplayer game may be played by a single real player together with a virtual player (s) that is controlled by the real player's information processing apparatus 2.

The information processing apparatuses 2 may be any type of information processing apparatus, such as a handheld game console, a mobile information processing apparatus such as a smartphone, or a stationary information processing apparatus such as a stationary game machine or personal computer. The information processing system 1 may include different types of information processing apparatuses 2.

Figure 2:
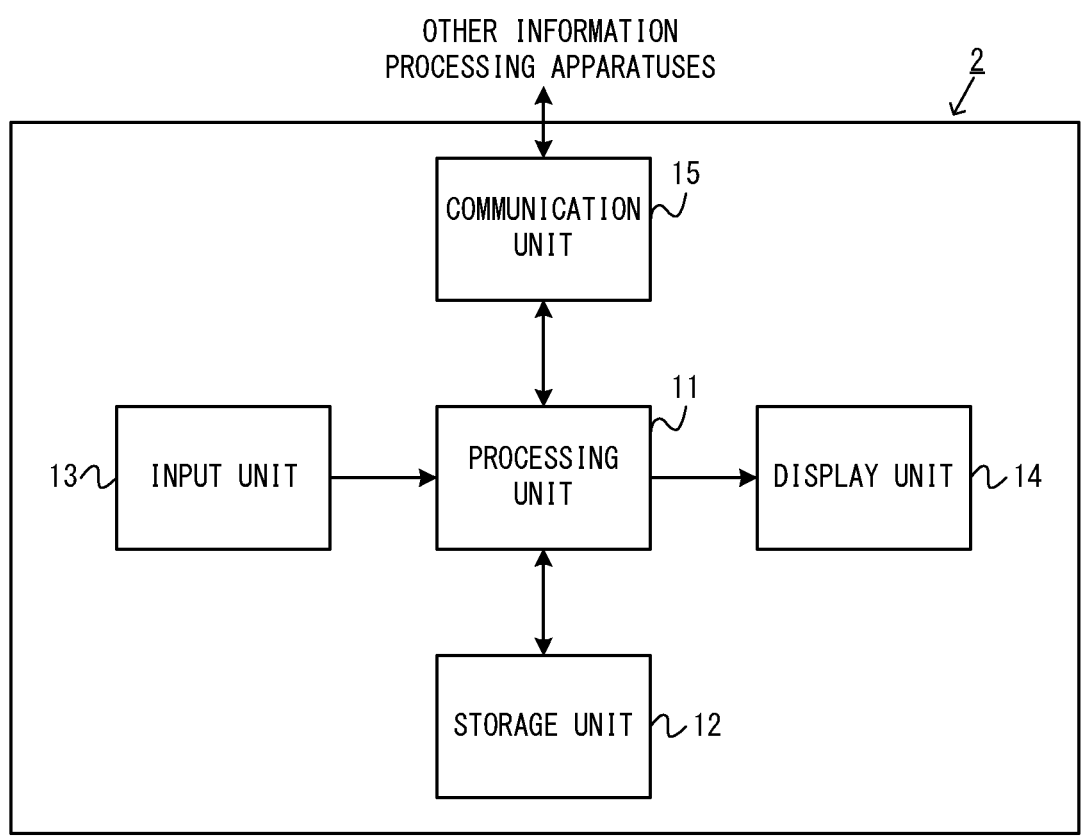
FIG. 2 is a block diagram showing a non-limiting example configuration of an information processing apparatus.

FIG. 2 is a block diagram showing a non-limiting example configuration of the information processing apparatuses 2. As shown in FIG. 2, each information processing apparatus 2 includes a processing unit 11 and a storage unit 12. The processing unit 11 is electrically coupled to units 12-15 of the information processing apparatus 2. The processing unit 11 has a CPU and a memory. In the information processing apparatus 2, the CPU executes various information processes by executing a program (more specifically, a game program) stored in the storage unit 12 using the memory. The storage unit 12 stores a program that is executed by the processing unit 11, data that is used in an information process by the processing unit 11, and data obtained by the information process, etc. The storage unit 12 may be either a storage medium that is provided in a main device of the information processing apparatus 2 (specifically, a device in which the processing unit 11 is provided), or a storage medium (e.g., a card storage medium) that is removably attached to the main device.

The information processing apparatus 2 includes an input unit 13. The input unit 13 may be any one that can receive a user's input. In this non-limiting example embodiment, the input unit 13 includes a touch panel provided on a screen of a display unit 14 described below. Note that the input unit 13 may include a button and/or an inertial sensor (e.g., an acceleration sensor or gyroscopic sensor), etc., in addition to or instead of the touch panel. The input unit 13 may be either one that is provided in the main device of the information processing apparatus 2, or one (e.g., a game controller) that is separated from the main device.

The information processing apparatus 2 includes a display unit 14. The display unit 14 displays an image (e.g., a game image, etc.) generated by an information process executed by the processing unit 11 of the information processing apparatus 2. The display unit 14 may be either a display device provided in the main device of the information processing apparatus 2, or a display device separated from the main device. Note that the information processing apparatus 2 may include a loudspeaker, a microphone, and/or a camera, etc.

The information processing apparatus 2 includes a communication unit 15. In this non-limiting example embodiment, the communication unit 15 is a communication module that performs near-field communication, such as communication complying with Bluetooth (registered trademark), which is a communication standard. The processing unit 11 communicates with another device (e.g., another information processing apparatus, etc.) using the communication unit 15 (in other words, through the communication unit 15). Note that the configuration of the communication unit for allowing the information processing apparatus 2 to communicate with another apparatus is not particularly limited. The communication unit 15 may have either a function of connecting to a mobile communication network (in other words, a mobile telephone communication network) for communication with another device, or a function of connecting to a wireless LAN using a communication module that has been authenticated for Wi-Fi, for example. Note that in the case where the information processing system 1 includes only a single information processing apparatus 2, the information processing apparatus 2 may not include the communication unit 15.

[2. Overview of Information Processes]

Next, information processes that are executed by the information processing apparatuses 2 will be outlined with reference to FIGS. 3-9. In this non-limiting example embodiment, each information processing apparatus 2 executes a game process for playing a multiplayer game. In addition, in this non-limiting example embodiment, multiple rounds of mini-game play are performed in a round of gameplay. Specifically, each player performs multiple rounds of mini-game play in a round of gameplay, and the players are ranked according to the results of the multiple rounds of mini-game play in the round of gameplay. Although, in this non-limiting example embodiment, it is assumed that the game is played by four players, the number of players is not particularly limited.

[2-1. Flow of Game]

Figure 3:
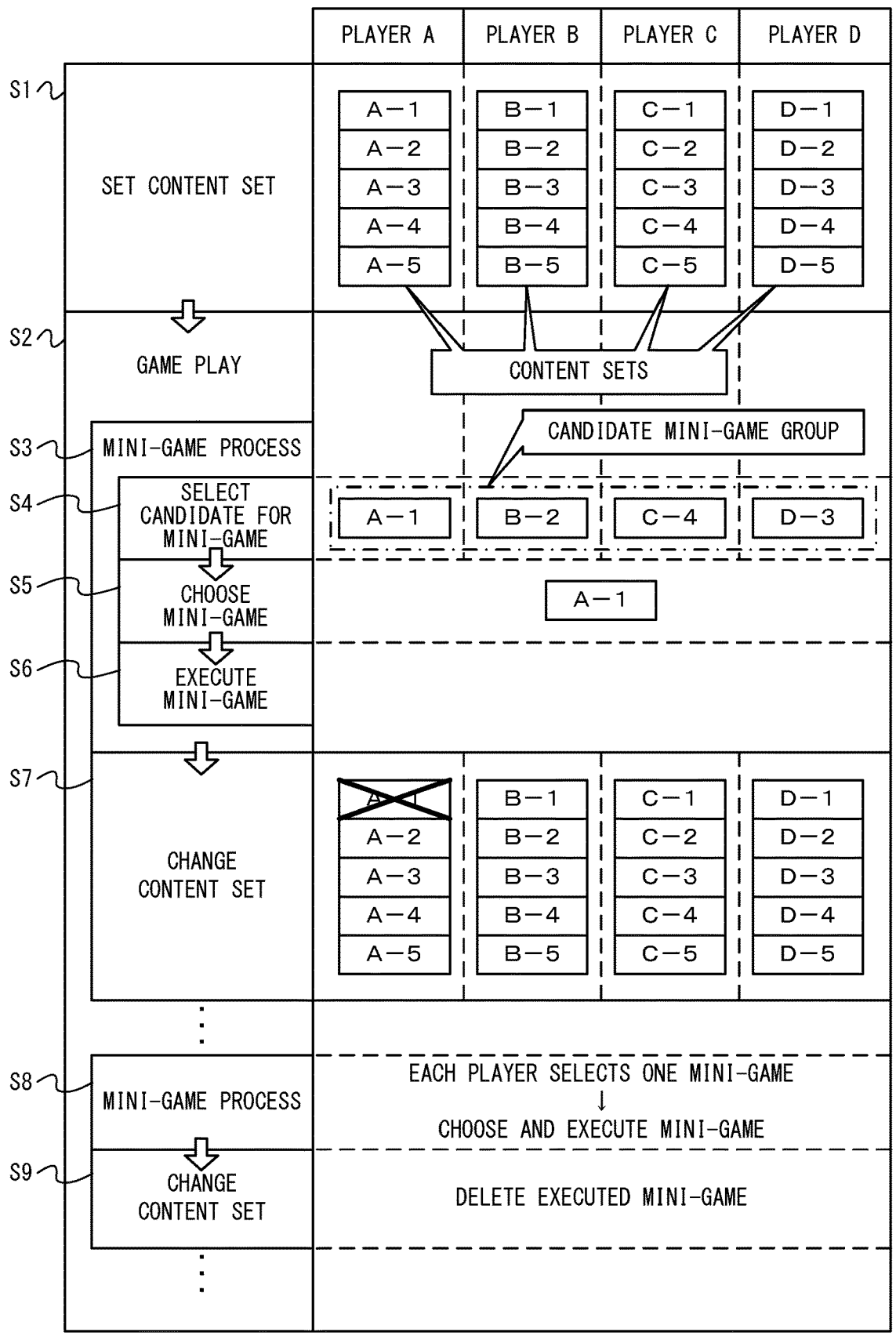
FIG. 3 is a diagram showing a non-limiting example rough flow of an information process that is executed in an information processing apparatus in this non-limiting example embodiment.

FIG. 3 is a diagram showing a non-limiting example rough flow of an information process that is executed by the information processing apparatuses 2 in this non-limiting example embodiment. As shown in FIG. 3, in this non-limiting example embodiment, before the start of the game (step S2), the information processing apparatuses 2 each set a content set for the respective player (step S1). As used herein, the term "content set" refers to a set of a plurality of game contents (specifically, mini-games). Note that in this non-limiting example embodiment, each content set includes five mini-games (see FIG. 3). Note that the number of mini-games included in each content set is not particularly limited. In another non-limiting example embodiment, the number of mini-games included in each content set may be specified by a player, Although it is herein assumed that a content set is set for each player before "game (play)" in step S2, the term "game (play)" as used herein refers to a specific mode in the entire game, for example. Therefore, a content set may, of course, be set for each player in an entire information process in game software or a game application.

In this non-limiting example embodiment, all mini-games included in the content sets are a candidate for a mini-game that is to be used in the game. Although described in detail below, if it has been decided in the game that mini-game play is to be performed, each player specifies (in other words, selects) a mini-game that the player desires to play, from their own content set. The information processing apparatuses 2 choose one from the plurality of (here, four) mini-games specified by the players, and execute the chosen mini-game. Thus, in this non-limiting example embodiment, the information processing apparatus 2 of each player sets candidates for a mini-game that is to be played in the game, as a content set, before the start of the game.

In this non-limiting example embodiment, the contents of a content set (in other words, mini-games included in a content set) are determined by a player. Note that a method for determining the contents of a content set will be described in detail below. In another non-limiting example embodiment, the information processing apparatus 2 of each player may not allow the player to specify the contents of a content set (see "(Variations Related to Setting of Content Set)" in "[4. Advantages and Variations of This Non-limiting Example Embodiment]" below).

As shown in FIG. 3, a content set is set for each player. In FIG. 3, a content set including mini-games A-1 to A-5 is set for a player A, a content set including mini-games B-1 to B-5 is set for a player B, a content set including mini-games C-1 to C-5 is set for a player C, and a content set including mini-games D-1 to D-5 is set for a player D. Although not shown, the content set of one player and the content set of another player may have some common mini-games. Alternatively, two or more players may have the same content set.

As shown in FIG. 3, the information processing apparatuses 2 start the game after the content sets have been set (step S2). Although described in detail below, in this non-limiting example embodiment, gameplay proceeds as player characters operated by the players move on a base stage (see FIG. 6).

If a predetermined start condition is satisfied in the game on the base stage, a mini-game starts. Specifically, if the start condition is satisfied, the information processing apparatuses 2 execute a mini-game process for playing a mini-game (step S3). Although described in detail below, in this non-limiting example embodiment, it is assumed that the start condition is that a player character lands on a predetermined square disposed on the base stage.

In the mini-game process, the information processing apparatuses 2 each initially select a candidate for a mini-game that is to be played in the mini-game process (step S4). A set of mini-games as the candidates is hereinafter referred to as a "candidate mini-game group" (see FIG. 3). Although described in detail below, in the selection process of step S4, each player specifies a mini-game from their own content set. In other words, mini-games included in a candidate mini-game group are obtained by the players each selecting one from the respective content set. Note that in FIG. 3, the mini-games A-1, B-2, C-4, and D-3 have been selected, which constitute a candidate mini-game group.

If candidates for a mini-game have been selected to create a candidate mini-game group, the information processing apparatuses 2 choose a mini-game from the candidate mini-game group (step S5). Although described in detail below, the information processing apparatuses 2 create a scene that, for example, a roulette is turned (see FIG. 8), and choose a mini-game from the candidate mini-game group, with a predetermined probability (in other words, substantially randomly).

If a mini-game has been chosen, the chosen mini-game is executed (step S6). Note that in this non-limiting example embodiment, the mini-game is played by all players (specifically, four players) participating in the game. Note that in another non-limiting example embodiment, the mini-game may be played by a portion of all players participating in the game.

In this non-limiting example embodiment, the information processing apparatuses 2 give each player (in other words, each player character) a prize corresponding to the result of the mini-game (in other words, the result of the mini-game process). Although described in detail below, the prize given to a player is coins the number of which corresponds to the rank of the player in the mini-game.

If the mini-game has ended, the information processing apparatuses 2 change the content sets (step S7). Specifically, the executed mini-game (in other words, the mini-game that has been played) is deleted from the corresponding content set. In the example of FIG. 3, since the mini-game A-1 has been chosen from the candidate mini-game group, the mini-game A-1 is deleted from the content set of the player A.

Therefore, the player A can no longer select the mini-game A-1 from their own content set in the mini-game process that is to be next executed.

If the mini-game has ended, the game is resumed back on the base stage. Thereafter, if the start condition is satisfied again on the base stage, the mini-game process is executed again (step S8). In the mini-game process, as in steps S4-S6, each player selects a mini-game from their own content set, one is chosen from the selected mini-games, and the chosen mini-game is executed. If the mini-game has ended, the executed mini-game is deleted from the corresponding content set as in step S7 (step S9). In this non-limiting example embodiment, in a round of gameplay, the mini-game process is repeatedly executed as gameplay proceeds.

In the game, each time the start condition is satisfied, a mini-game is executed. If a predetermined end condition is satisfied, the information processing apparatuses 2 end the game. As a result, a round of gameplay is ended. Note that the end condition is not particularly limited. Examples of the end condition include that play has been done a predetermined number of turns, and that any of the players has won a predetermined number of coins. Alternatively, the end condition may be one that is satisfied after at least multiple rounds of mini-game play have been performed in a round of gameplay. This substantially prevents the game from ending after only one round of mini-game play has been performed in a round of gameplay, and therefore, can substantially prevent a reduction in the amusingness of the game.

Note that after a round of gameplay has ended, the result of the game (i.e., the rank of each player) is determined. In this non-limiting example embodiment, the information processing apparatuses 2 determine the ranks of the players based on the total number of coins that each player has won in mini-games played in the game. Note that the method for determining the result of the game is not particularly limited. In another non-limiting example embodiment, for example, player characters may be allowed to exchange coins for another item in the game, and the rank of each player may be determined according to the number and/or types of items obtained by the exchanging.

As described above, in this non-limiting example embodiment, each player sets a content set before gameplay (S1), each player selects a mini-game from their own content set in gameplay (S4), and a mini-game that is to be actually played is chosen from the mini-games selected by the players (S5). This allows each player themselves to set a mini-game that is a candidate for one which is to be actually played. In this case, each player can set a content set that includes a mini-game which the player is good at, or a content set that includes a mini-game which another player is bad at. Each player also selects a mini-game that is a candidate for one which is to be actually played, taking into account the contents of their own content set (and, optionally, the content set of another player(s)). Thus, in this non-limiting example embodiment, the players can have tactics for setting a content set and selecting a mini-game from the content set. Therefore, the strategic aspects of the game can be improved, resulting in an improvement in the amusingness of the game.

[2-2. Setting Content Set]

Next, a non-limiting example process of setting a content set (step S1 of FIG. 3) in the information processing apparatuses 2 will be described with reference to FIGS. 4 and 5. In this non-limiting example embodiment, before the start of the game, a setting image for setting a content set is initially displayed on the display unit 14 of each information processing apparatus 2. After a content set has been set by the player, a determined-set image that indicates the contents of the content set that has been set by the player is displayed on the display unit 14.

Figure 4:
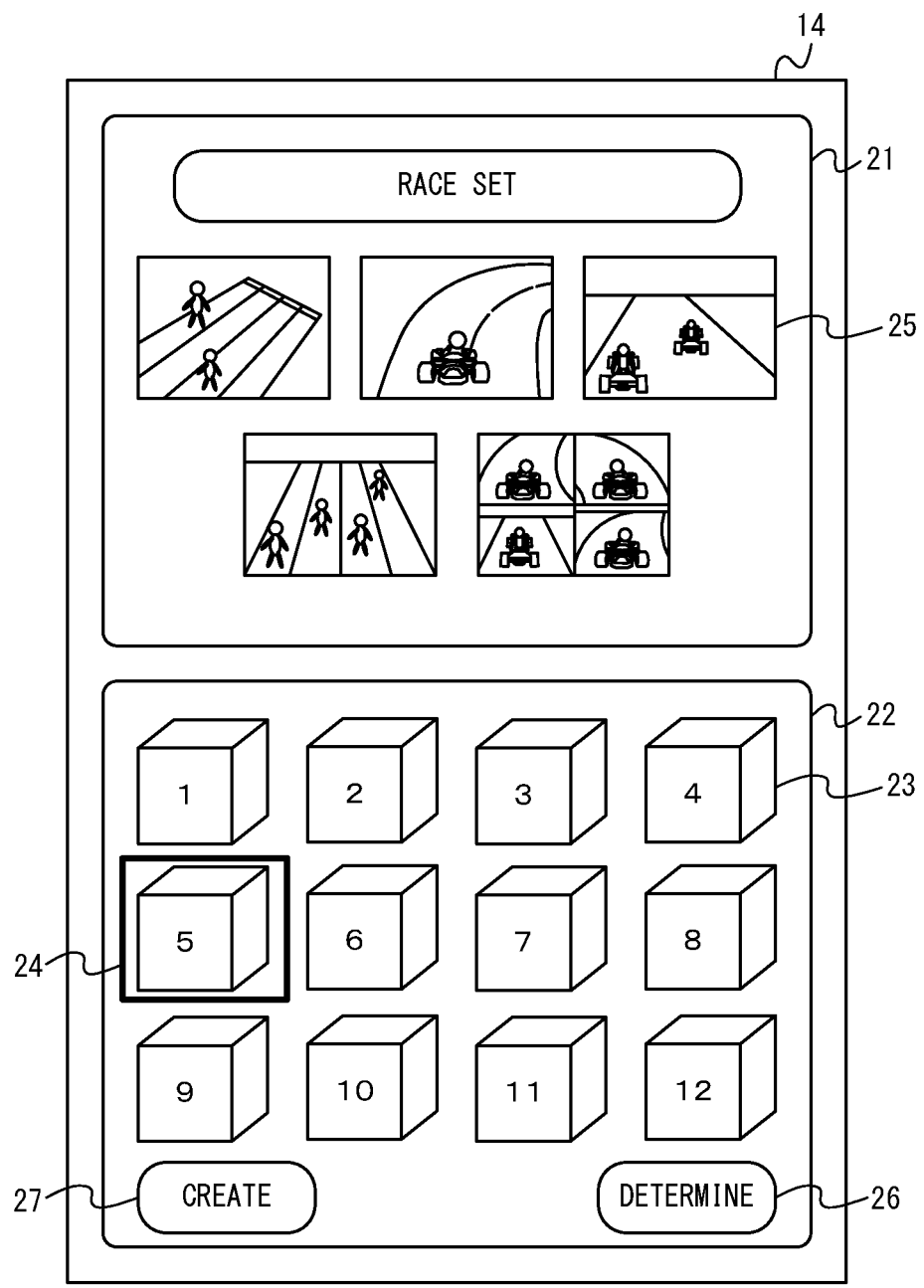
FIG. 4 is a diagram showing a non-limiting example setting image.

FIG. 4 is a diagram showing a non-limiting example of the setting image. As shown in FIG. 4, in this non-limiting example embodiment, the setting image contains a set content image 21 and a set candidate image 22. In this non-limiting example embodiment, the set content image 21 is displayed in an upper region of a screen of the display unit 14, and the set candidate image 22 is displayed in a lower region of the screen.

Note that in this non-limiting example embodiment, it is assumed that a game image is displayed on a single screen. In another non-limiting example embodiment, a game image may be displayed on two screens. For example, an image displayed in the upper region of the display unit 14 in this non-limiting example embodiment may be displayed on a first display device, and an image displayed in the lower region of the display unit 14 may be displayed on a second display device that is different from the first display device.

The set candidate image 22 indicates previously prepared content sets (in other words, candidates for a content set that is to be set by a player). Note that in this non-limiting example embodiment, a plurality of content sets are previously prepared in a game program that is executed by the information processing apparatuses 2. As shown in FIG. 4, the set candidate image 22 contains a plurality of icons (e.g., icons 23 shown in FIG. 4) representing the content sets. In this non-limiting example embodiment, when the player of an information processing apparatus 2 has specified an icon (e.g., by touching the icon) from the icons contained in the set candidate image, the information processing apparatus 2 puts the specified icon (in other words, a content set represented by the icon) into a selected state. Note that the icon in the selected state is indicated by a cursor 24 (see FIG. 4).

The set content image 21 indicates the contents of a content set corresponding to an icon in the selected state, of the icons contained in the set candidate image. In this non-limiting example embodiment, as shown in FIG. 4, the set content image 21 contains an image (e.g., a thumbnail image 25) of each mini-game included in the content set in the selected state. Note that the details of an image indicating a mini-game are not particularly limited. An image indicating a mini-game may be a game image that may be displayed in gameplay of the mini-game, or a title image of the mini-game. This allows a player to understand details of mini-games included in the content set in the selected state. In addition, in this non-limiting example embodiment, the set content image 21 contains an image indicating a title (in FIG. 4, "RACE SET") of the content set in the selected state.

Note that in this non-limiting example embodiment, mini-games included in a previously prepared content set are not particularly limited. A content set may include mini-games of the same genre, like the "race set" of FIG. 4, for example. A mini-game may be the same as one that is included in another game application (i.e., a game application different from one of the game program in this non-limiting example embodiment). A content set may include mini-games that are included in another single game application.

When the setting image is being displayed, the player can see the set candidate image 22 in the lower region, put a content set that the player desires to check into the selected state, see the set content image 21 in the upper region to check mini-games included in the content set in the selected state, and determine a content set that is to be used by the themselves in the game.

As shown in FIG. 4, the set candidate image 22 contains a determination button 26. When the player has pressed the determination button 26, the information processing apparatus 2 determines that a content set which is in the selected state at that time is one that is to be set for the player.

Thus, in this non-limiting example embodiment, the information processing apparatus 2 sets a content set specified by the player, of a plurality of previously prepared content sets, as a content set for the player. This allows the player to easily set a content set, because the player does not have to select mini-games that are to be included in a content set, from a plurality of mini-games, on a one-by-one basis. For example, in the case where a large number of mini-games are previously prepared, it takes time for a player to check the details of the mini-games. If, as in this non-limiting example embodiment, previously prepared content sets are available, the time it takes to set a content set before the start of the game can be reduced, which facilitate the setting operation of a player.

Alternatively, in this non-limiting example embodiment, the player can create a content set by selecting mini-games on a one-by-one basis, instead of selecting one from previously prepared content sets. Specifically, the information processing apparatus 2 creates a (new) content set including a plurality of mini-games that are specified by the player from a plurality of previously prepared mini-games. Specifically, in this non-limiting example embodiment, the set candidate image 22 contains a creation button 27. When the player has pressed the creation button 27, the information processing apparatus 2 displays a set creation image on the display unit 14. Although not shown, the set creation image indicates a list of mini-game that can be played in the game. The information processing apparatus 2 receives an input that specifies five of the mini-games indicated by the set creation image, and creates a content set including the five specified mini-games. Thus, the player can select five from mini-games that can be played in the game, and create a content set including the selected mini-games.

Alternatively, in this non-limiting example embodiment, the player can create a content set including mini-games that are randomly selected. Specifically, in this non-limiting example embodiment, the information processing apparatus 2 receives an instruction to automatically create a content set, from the player, in a situation that the set creation image is being displayed. According to this instruction, the information processing apparatus 2 automatically selects five from a plurality of mini-games (in other words, mini-games that can be played in the game) indicated by the set creation image. The selection method is not particularly limited. For example, the five mini-games are randomly selected. The information processing apparatus 2 creates a content set including the five selected mini-games. Thus, instead of the player selecting five mini-games by themselves, the information processing apparatus 2 may automatically select mini-games.

Furthermore, in this non-limiting example embodiment, mini-games can be added to favorites (described in detail below). The information processing apparatus 2 may allow the player to select mini-games that are to be included in a content set, from favorite mini-games (i.e., mini-games that have been added to favorites) in the set creation image. For example, when the set creation image is being displayed, the information processing apparatus 2 may change the displayed details of the set creation image, according to the player's instruction, from a state in which a list of mini-games that can be played in the game is displayed, to a state in which a list of favorite mini-games (i.e., mini-games added to favorites) is displayed. Note that in another non-limiting example embodiment, the information processing apparatus 2 may display favorite mini-games in a manner different from that of the other mini-games (e.g., favorite mini-games are marked), favorite mini-games may be displayed before the other mini-games in terms of the order in which the mini-games are listed, in a situation that a list of mini-games that can be played in the game is being displayed. In this case, the information processing apparatus 2 may receive the player's input in a manner that allows only favorite mini-games to be selected.

When a list of favorite mini-games is being displayed, the information processing apparatus 2 receives an input that specifies five mini-games, and creates a content set including the five specified mini-games. Alternatively, in the above situation, the information processing apparatus 2 creates a content set including five mini-games automatically selected according to an instruction specified by pressing the automatic creation button. Thus, the information processing apparatus 2 can create a content set including favorite mini-games.

If the creation of a content set has been completed in the situation that the set creation image is being displayed, the information processing apparatus 2 displays the setting image (see FIG. 4) again. In this case, the information processing apparatus 2 adds and displays an icon representing the newly created content set in the set candidate image 22 contained in the setting image. As a result, the player is allowed to select the newly created content set, and set the content set as one that is to be used in the game. Thus, the player is allowed to use, in the game, (a) a content set including mini-games specified by themselves, (b) a content set including mini-games randomly selected, and (c) a content set including favorite mini-games. Note that the information processing apparatus 2 may save (in other words, store) a content set newly created by the player, as a portion of saved data, into, for example, the storage unit 12. In this case, the information processing apparatus 2 may allow the newly created content set to be selected by the player after the game program is next started.

In this non-limiting example embodiment, each information processing apparatus 2, when a content set has been set for the respective player (i.e., the player of that information processing apparatus 2), sends set information indicating the respective player, and that content set, to the other information processing apparatuses 2. Specifically, the set information contains information for identifying each mini-game included in the content set. Note that in the case of a previously prepared content set, the set information may contain information for identifying the content set instead of the information for identifying mini-games.

By receiving the set information, the other information processing apparatuses 2 can know the contents of a content set that has been set in the information processing apparatus that has sent the set information. In this non-limiting example embodiment, the four information processing apparatuses 2a-2d included in the information processing system 1 send the respective set information. Thus, if a content set has been set in all the information processing apparatuses 2, each information processing apparatus 2 can obtain the content sets set for the players of all the four information processing apparatuses 2 (i.e., itself and the other information processing apparatuses 2).

If the content sets for all the four players have been obtained, each information processing apparatus 2 displays a determined-set image on the display unit 14. The determined-set image indicates the contents of a content set that has been set by each player. FIG. 5 is a diagram showing a non-limiting example of the determined-set image. As shown in FIG. 5, in this non-limiting example embodiment, the determined-set image contains a set content image 31 and a set image 32. In FIG. 5, the set content image 31 is displayed in the upper region of the screen of the display unit 14, and the set image 32 is displayed in the lower region of the screen.

The set image 32 indicates the content sets that have been set for the players. Specifically, the set image 32 indicates images indicating the respective players (in FIG. 5, images indicating "A" to "D"), and images indicating content sets that have been set for the respective players (in FIG. 5, an image indicating a title of the content set, such as "RACE SET"), in association with each other. Note that the image indicating a player may be an image of a player character, an image of the player's avatar, or an image indicating a name of the player or player character. In this non-limiting example embodiment, when the player has specified one of the four content sets contained in the set image 32, the specified content set is put into the selected state. Note that the content set in the selected state is indicated by the cursor 34 (see FIG. 5).

As with the set content image 21 of FIG. 4, the set content image 31 indicates the contents of a content set. In the determined-set image, the set content image 31 indicates the contents of a content set (in FIG. 5, the content set of the player A) that is in the selected state in the set image 32. Specifically, the set content image 31 contains a title of the content set in the selected state, and an image indicating each mini-game included in the content set. Therefore, in this non-limiting example embodiment, each player can check the contents of a content set that has been set by any player by putting that content set into the selected state in the set image 32.

As described above, in this non-limiting example embodiment, each player can check the contents of content sets that have been set by all the players before the start of gameplay. Here, if a first player can know the contents of a content set that has been set by a second player before setting their own content set, the first player can set their own content set, taking into account the contents of the content set that has been set by the second player. Therefore, in this assumed case, setting a content set earlier may be disadvantageous to the players in the game, and therefore, unfair competition may occur between the players. In contrast to this, in this non-limiting example embodiment, the contents of content sets are published after all the players have set their content sets, and therefore, the possibility that unfair competition may occur between the players can be reduced.

Figure 5:
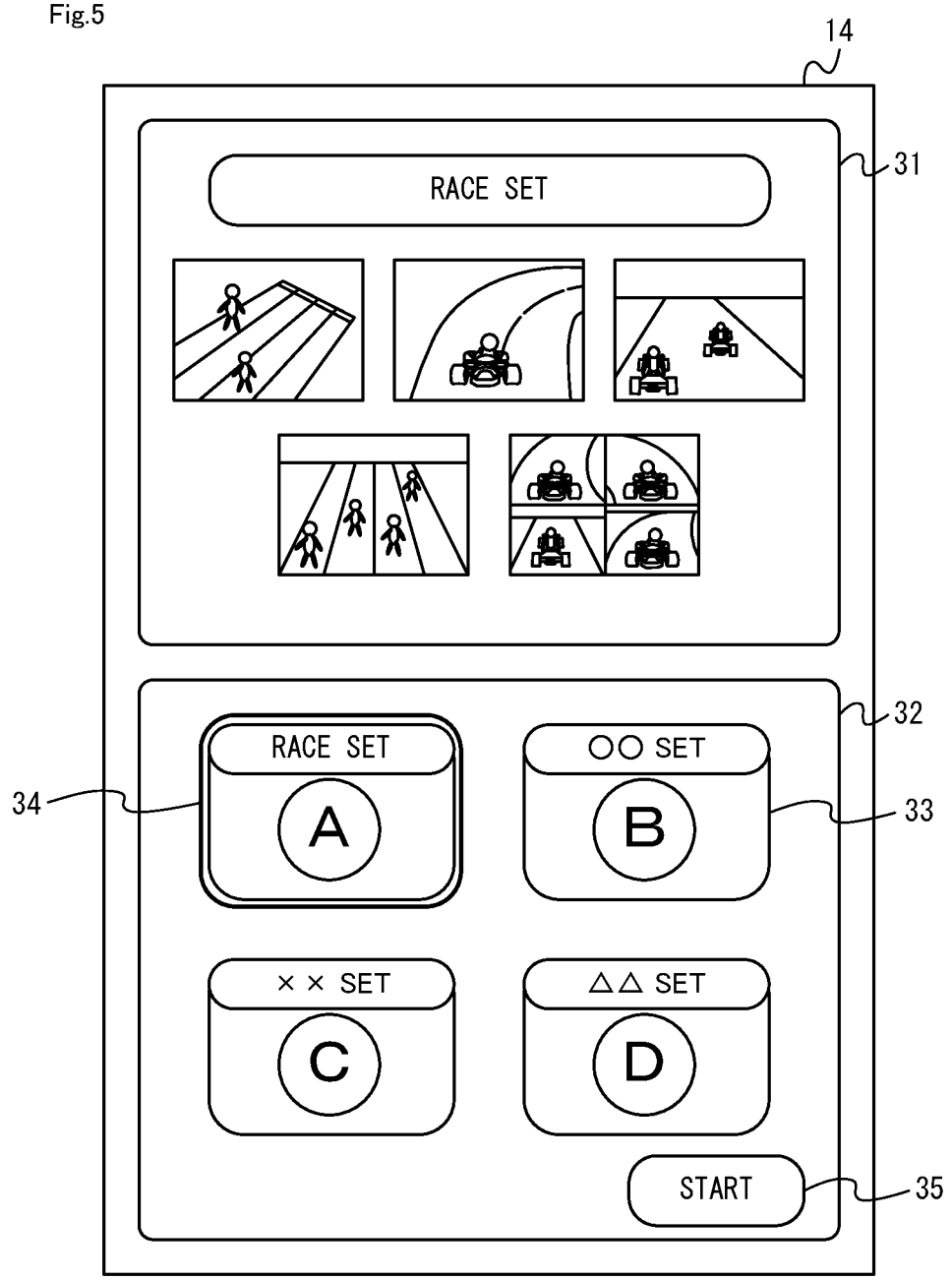
FIG. 5 is a diagram showing a non-limiting example determined-set image.

In addition, as shown in FIG. 5, the set image 32 contains a game start button 35 for providing an instruction to start gameplay. Each player instructs their own information processing apparatus 2 to start gameplay by pressing the game start button 35. In this non-limiting example embodiment, when the four players all have input an instruction to start gameplay, gameplay is started. Note that the condition for starting gameplay is not particularly limited. For example, in another non-limiting example embodiment, after all the players have set a content set, when a predetermined player has input an instruction to start gameplay, gameplay may be started. Note that the predetermined player may be the first player in the case where each player is numbered, for example. Alternatively, in the case where one of the information processing apparatuses 2 is a base apparatus that executes a main information process, and the other information processing apparatuses 2 are a subsidiary information processing apparatus that executes an auxiliary information process, the predetermined player may be a player who uses the base information processing apparatus 2.

Processes executed in gameplay will now be described in [2-3. Process on Base Stage] to [2-6. Changing Content Sets].

[2-3. Process on Base Stage]

Figure 6:
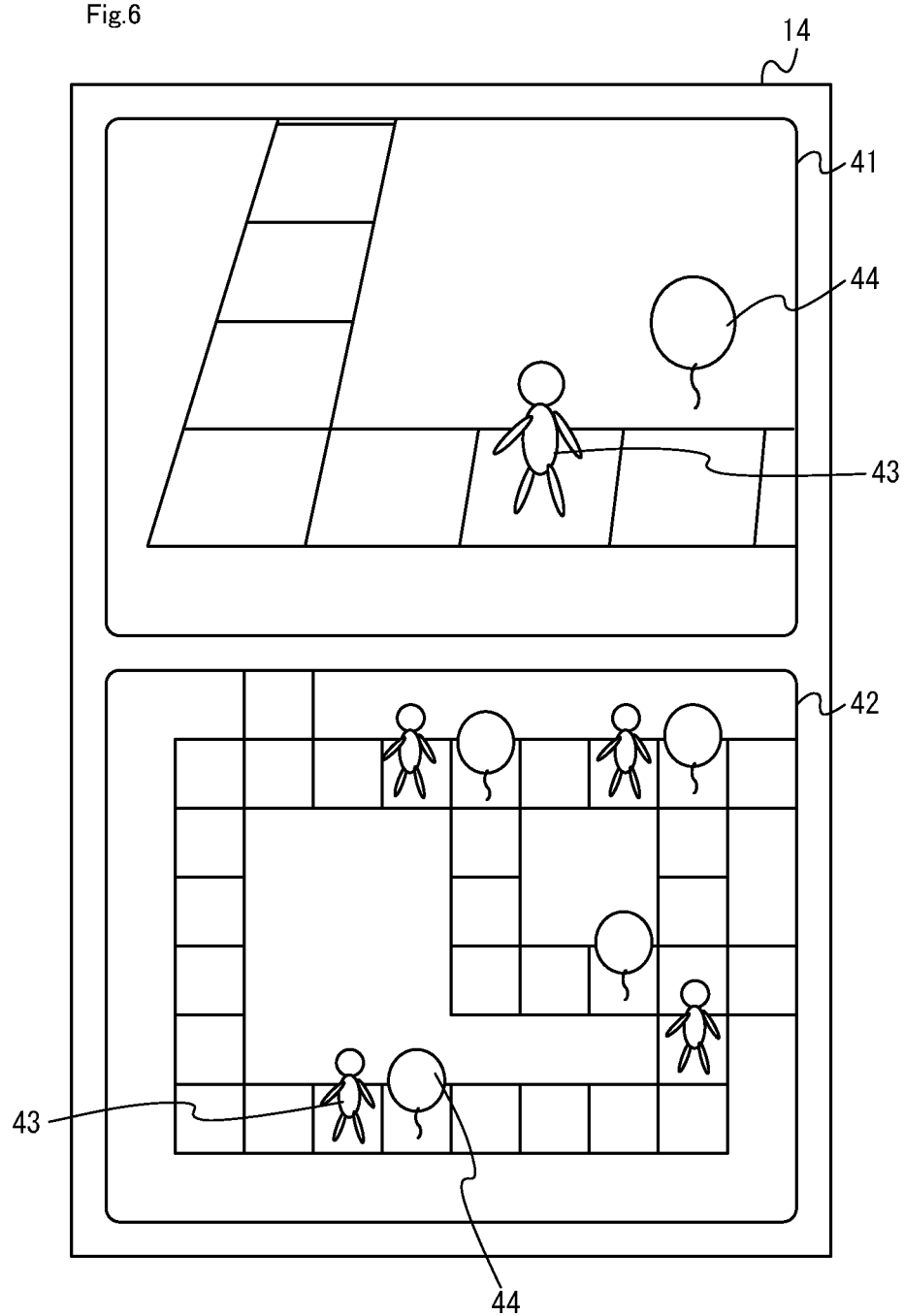
FIG. 6 is a diagram showing a non-limiting example game image that is displayed in gameplay.

A process on the base stage will be described with reference to FIG. 6. FIG. 6 is a diagram showing a non-limiting example game image displayed in gameplay. In this non-limiting example embodiment, when the game has been started, each information processing apparatus 2 displays a game image indicating the base stage on the display unit 14. As shown in FIG. 6, a game space image indicating a portion of the game space of the base stage is displayed in the upper region of the display unit 14. In addition, a map image indicating a two-dimensional view of the base stage is displayed in the lower region of the display unit 14. Each information processing apparatus 2 displays a game space image and a map image that indicate a game space within a range including a player character (in FIG. 6, a player character 43) that is operated by the respective player, i.e., a player who uses that information processing apparatus 2.

As shown in FIG. 6, on the base stage, a plurality of squares are disposed in the game space. In this non-limiting example embodiment, on the base stage, a dice is rolled, and a player character moves the number of squares corresponding to the value of the dice. Thus, a game proceeds like a certain board game. Here, the base stage includes normal squares, and in addition, squares in which an event occurs when a player character lands on the squares. In this non-limiting example embodiment, when a player character lands on a square in which a balloon 44 is provided, a mini-game will be started. Note that a condition for starting a mini-game (i.e., the start condition) is not particularly limited. For example, in another non-limiting example embodiment, the start condition may be that a player character passes a predetermined square. The type of a square which causes the occurrence of an event is not particularly limited. In addition to the square which causes the start of a mini-game, there may be a square which allows a player character who lands on the square to obtain an item.

[2-4. Mini-Game Process]

[2-4-1. Selecting Mini-Game]

The mini-game process (steps S3-S6 in FIG. 3) for executing a mini-game will be described with reference to FIGS. 7 and 8. At the beginning of the mini-game process, each information processing apparatus 2 executes a selection process of selecting a mini-game from the content set of the respective player (step S4 of FIG. 3). In this non-limiting example embodiment, in the selection process, a game selection image is displayed on the display unit 14.

Figure 7:
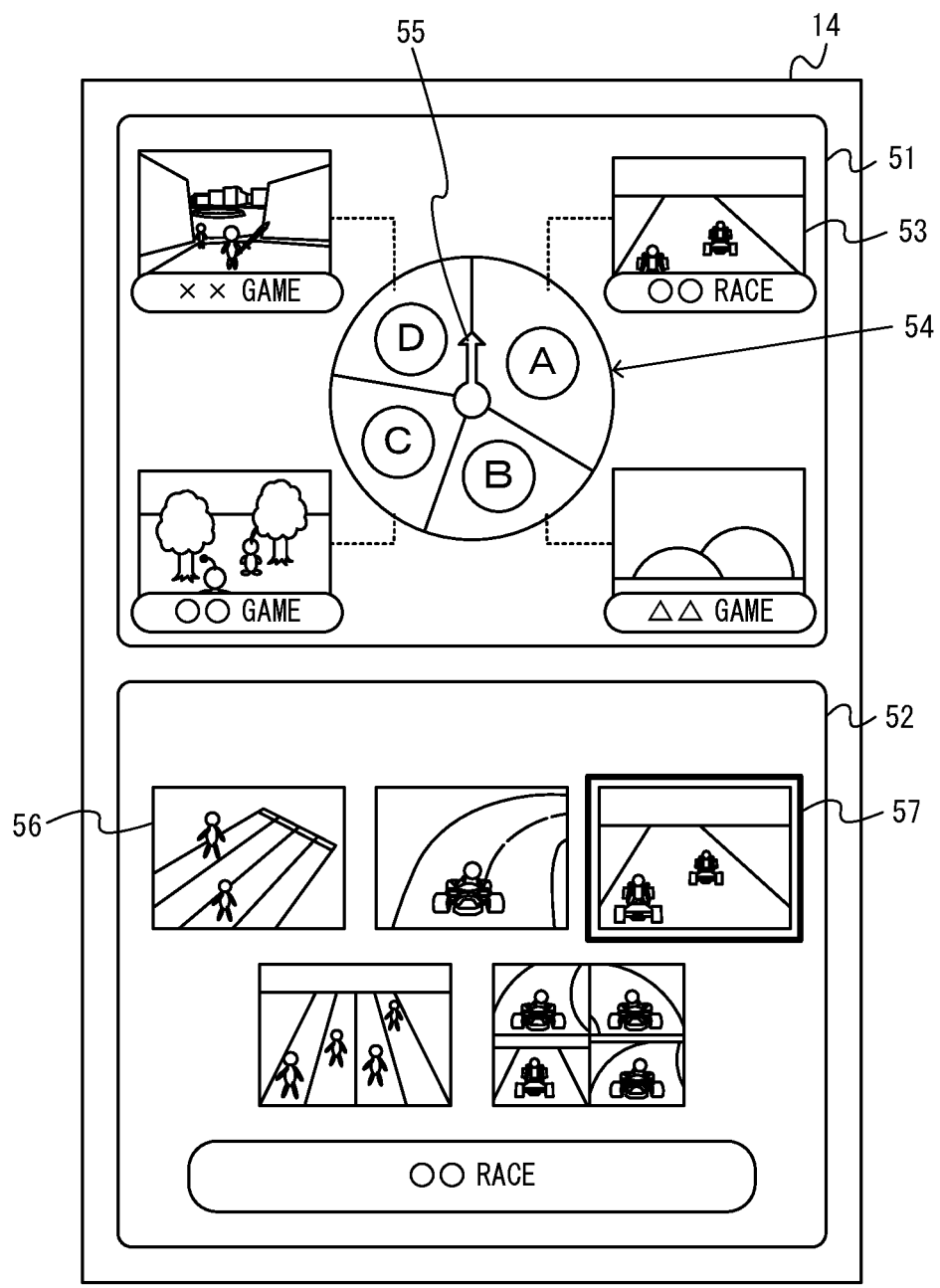
FIG. 7 is a diagram showing a non-limiting example game selection image.

FIG. 7 is a diagram showing a non-limiting example of the game selection image. As shown in FIG. 7, the game selection image contains a selected state image 51 and a selection candidate image 52. In this non-limiting example embodiment, the selected state image 51 is displayed in the upper region of the screen of the display unit 14, and the selection candidate image 52 is displayed in the lower region of the screen.

The selection candidate image 52 indicates mini-games included in a content set that has been set for the player of an information processing apparatus 2 which displays that image. Specifically, the selection candidate image 52 contains images (e.g., thumbnail images 56) of mini-games included in the content set. Although, in FIG. 7, the selection candidate image 52 indicates five mini-games, the selection candidate image 52 may indicate four or less mini-games when a mini-game(s) has been deleted from the content set by the content set changing process (step S7). In this non-limiting example embodiment, in the information processing apparatus 2, when the player has specified one of the mini-games included in the selection candidate image 52, the specified mini-game is put into the selected state. Note that the mini-game in the selected state is indicated by a cursor 57 (see FIG. 7). In addition, in this non-limiting example embodiment, the selection candidate image 52 contains an image indicating a title (in FIG. 7, "◯◯ RACE") of the mini-game in the selected state.

The selected state image 51 contains currently selected mini-game images (e.g., an image 53 in FIG. 7) each indicating a mini-game in selected state in the respective player's content set. In addition, as shown in FIG. 7, the selected state image 51 contains a roulette image 54. Although described in detail below, the roulette image 54 is used to create a scene that a mini-game to be executed is chosen. The roulette image 54 has regions corresponding to the respective players (regions "A" to "D" in FIG. 7). The currently selected mini-game image of each player is displayed in association with the region of that player in the roulette image 54. Specifically, in FIG. 7, each currently selected mini-game image is linked to the respective player's region in the roulette image 54 by a dotted line. Thus, by viewing the selected state image 51, each player can know mini-games that are currently selected by all the players. Note that the game selection image of FIG. 7 is displayed in the information processing apparatus 2a of the player A, and the mini-game in the selected state in the selection candidate image 52 is the same as a mini-game associated with the player A's region in the roulette image 54 of the selected state image 51.

In this non-limiting example embodiment, during a predetermined selection period, each player can put one of the mini-games indicated by the selection candidate image 52 into the selected state, or replace the mini-game in the selected state with another mini-game. The information processing apparatuses 2 end the selection period when a predetermined period of time has passed since the start of the mini-game process. When the selection period has ended, each information processing apparatus 2 selects a mini-game that is in the selected state at the end of the selection period, so that a candidate mini-game group including the four mini-games selected by the players is created. Note that in another non-limiting example embodiment, the information processing apparatuses 2 may receive, from the respective players, an instruction to determine that a mini-game in the selected state is to be included in a candidate mini-game group. In this case, when all the players have determined a mini-game, the information processing apparatuses 2 may end the selection period.

As described above, in this non-limiting example embodiment, each information processing apparatus 2 selects a mini-game from a content set according to the respective player's instruction. Each player can specify a portion of the candidate mini-game group by themselves. For example, each player specifies a mini-game, taking into account whether a mini-game which the player is good at (or a mini-game which another player is bad at) should be specified for the current mini-game event, or saved for the next mini-game event, etc. As a result, in this non-limiting example embodiment, the strategic aspects of the game involved in choosing a mini-game to be executed can be improved, resulting in an improvement in the amusingness of the game.

Note that the method for selecting a mini-game from a content set according to a player's instruction is not particularly limited. For example, in another non-limiting example embodiment, each information processing apparatus 2 may receive a determination instruction from the respective player, and select a mini-game that is in the selected state at the time of reception of the determination instruction. In another non-limiting example embodiment, the number of selected mini-games may not be one, and a plurality of mini-games may be selected. In this case, the selected mini-games are included in the mini-game candidate group, and a mini-game to be executed is chosen from the mini-game candidate group.

Note that in this non-limiting example embodiment, in each information processing apparatus 2, each time a mini-game in the selected state is replaced with another during the selection period, the information processing apparatus 2 sends information indicating the mini-game newly put into the selected state (e.g., identification information of the mini-game) to the other information processing apparatuses 2. As a result, each information processing apparatus 2 can obtain information about mini-games that are in the selected state in the other information processing apparatuses 2. Therefore, each information processing apparatus 2, when receiving information about a mini-game from another information processing apparatuses during the selection period, updates the selected state image 51 with the most recent information.

Thus, in this non-limiting example embodiment, during the selection period, a mini-game in the selected state for another player is replaced with another mini-game if the selected state is changed. Therefore, each player can know the contents of a content set of another player to some extent during the selection period. This allows each player to decide which mini-game to specify for themselves (e.g., decide whether to specify the same mini-game of another player, etc.) while checking what kind of mini-games are included in the content sets of the other players. Therefore, the strategic aspects of the game involved in specifying a mini-game to be executed can be improved, resulting in an improvement in the amusingness of the game.

Note that in this non-limiting example embodiment, in each information processing apparatus 2, not all mini-games (images) included in the content set of any other player are displayed to the respective player during the gameplay period. In other words, each information processing apparatus 2 displays an image indicating a mini-game in the selected state of those included in a content set for each of the other players during the gameplay period, but not an image that allows the respective player to know all mini-games included in the content set (e.g., an image showing a list of mini-games) of each of the other players. As a result, in gameplay, none of the players can exactly know the contents of a content set of any other player, and therefore, each player only guesses the contents of a content set of each of the other players. Therefore, the strategic aspects of the game can be further improved.

[2-4-2. Choosing Mini-Game to be Executed]

If the candidate mini-game group has been created (in other words, the selection period has ended), the information processing apparatuses 2 choose a mini-game to be executed from the candidate mini-game group (step S5 in FIG. 3). The method for choosing a mini-game to be executed is not particularly limited. In this non-limiting example embodiment, the information processing apparatuses 2 choose a mini-game substantially randomly from the candidate mini-game group. As used herein, the term "substantially randomly" with respect to choosing a mini-game does not mean in strict sense that a mini-game is exactly randomly chosen, and means that a mini-game is selected with a probability so that the same mini-game is not always chosen when the choice is performed a plurality of times.

When a mini-game is chosen from the candidate mini-game group, the information processing apparatuses 2 display a scene that a hand 55 is turned in the roulette image 54 of FIG. 7, and is then stopped in the region of the players associated with the chosen mini-games in the roulette image 54 (i.e., a mini-game that is associated with the region where the hand 55 is stopped is chosen).

Here, the roulette image 54 of FIG. 7 indicates a probability with which each mini-game included in the mini-game candidate group is selected. Specifically, the area of the region of each player in the roulette image 54 indicates a probability with which a mini-game selected by that player is selected. For example, in FIG. 7, the area of the player A's region is greater than the areas of the regions of the other players B-D, and therefore, the roulette image 54 indicates that the probability with which a mini-game selected by the player A is chosen is higher than the probability with which each of mini-games selected by the other players B-D is chosen.

In this non-limiting example embodiment, a mini-game selected by a player who satisfies the start condition (i.e., a player character operated by that player lands on a square having a balloon) is chosen with a higher probability, compared to mini-games selected by the other players. Note that in the example of FIG. 7, the player A satisfies the start condition, and therefore, the probability with which the mini-game selected by the player A is chosen is adjusted to be higher than the probability with which each of the mini-games selected by the other players B-D is chosen. As a result, the player A's region in the roulette image is adjusted to be larger than the region of each of the other players B-D.

Note that in this non-limiting example embodiment, a plurality of player characters may simultaneously land on the same type of square having a balloon. In this case, each information processing apparatus 2 adjusts the probability with which each of the mini-games selected by the players whose player characters land on a square having a balloon is chosen such that these probabilities are higher than the probability with which each of the mini-games selected by the other players is chosen.

Thus, in this non-limiting example embodiment, each player is given an incentive to satisfy the start condition so that a mini-game selected by themselves is more likely to be executed. Here, in this non-limiting example embodiment, the base stage contains a square which causes the occurrence of an event other than a mini-game. Therefore, a player may not intend to cause a player character to land on a square that causes the occurrence of a mini-game event, and may intend to cause a player character to land on a square that causes the occurrence of another event. In this case, a mini-game event less frequently occurs, so that the game is not likely to proceed smoothly. Therefore, in this non-limiting example embodiment, each player is given an incentive to satisfy the start condition so that a mini-game event more frequently occurs, and therefore, the game proceeds smoothly.

Note that when a plurality of players have selected the same mini-game, the probability with which that mini-game is chosen is higher than when that mini-game has been selected by only one player. For example, when a mini-game selected by the player A is the same as a mini-game selected by the player B, the same mini-game is executed no matter which of the mini-games (in other words, the players) is chosen. Thus, in each information processing apparatus 2, when two or more of the same mini-games are included in the candidate mini-game group, that mini-game is chosen with a higher probability than when that mini-game is singly included in the candidate mini-game group. Therefore, according to this non-limiting example embodiment, a player can select the same mini-game selected by another player to increase the probability with which that mini-game is chosen from the candidate mini-game group. Therefore, the strategic aspects of the game involved in selecting a mini-game can be improved, resulting in an improvement in the amusingness of the game.

The probability with which a mini-game is chosen may be changed according to a factor other than the satisfaction of the start condition by a player. For example, if a player character has used a predetermined item, the information processing apparatuses 2 may increase the probability with which a mini-game selected by a player corresponding to the player character is chosen.

After the end of the scene using the roulette image 54, each information processing apparatus 2 displays a game choice image on the display unit 14. The game choice image indicates a situation that the hand 55 stops in the scene of the roulette image 54, indicating the chosen mini-game (in other words, a mini-game to be executed in the current mini-game process).

Figure 8:
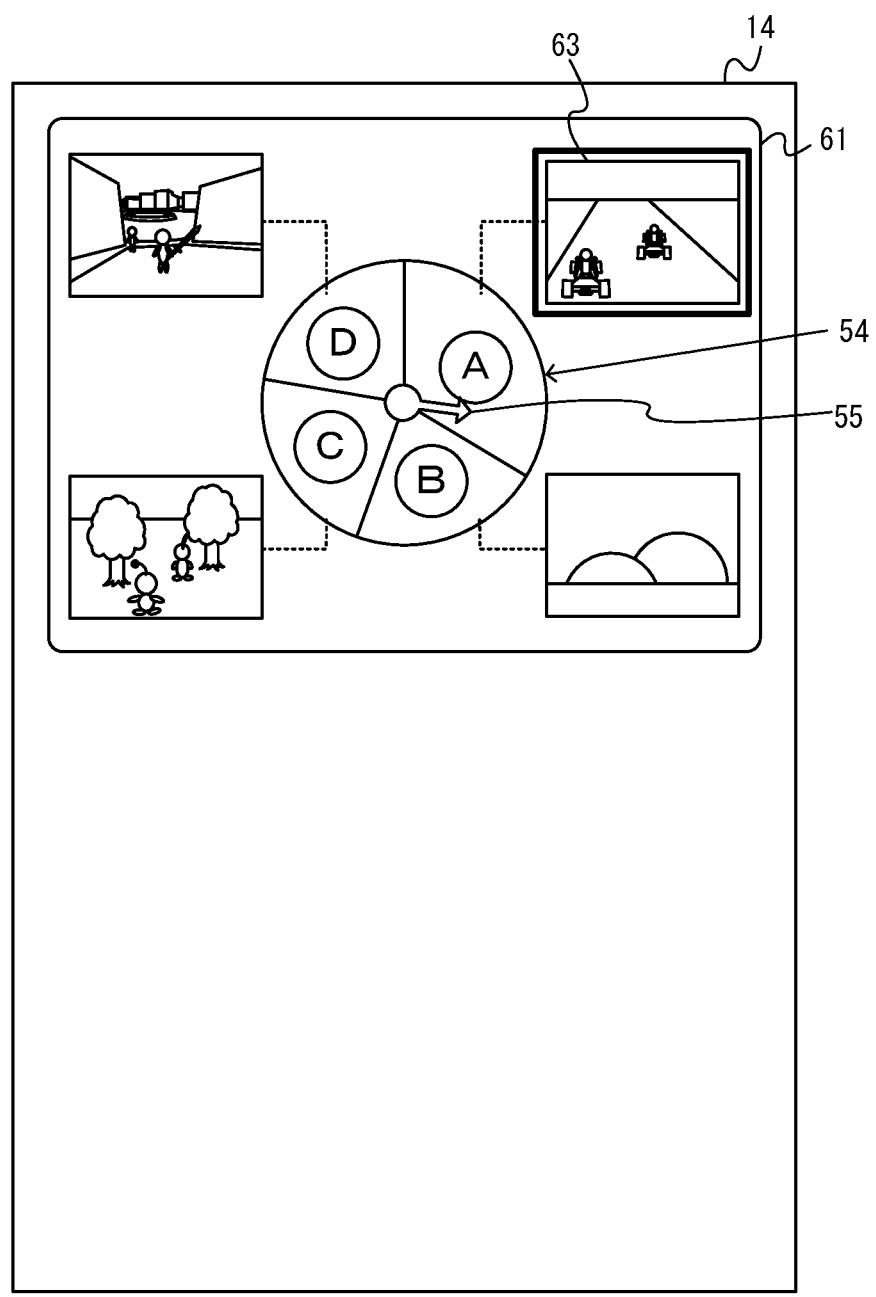
FIG. 8 is a diagram showing a non-limiting example game choice image.

FIG. 8 is a diagram showing a non-limiting example game choice image. As shown in FIG. 8, the game choice image 61 is displayed in the upper region of the screen of the display unit 14. Note that when the game choice image is displayed, any suitable image may be displayed in the lower region of the screen of the display unit 14.

As with the selected state image 51, the game choice image 61 contains the roulette image 54 and currently selected mini-game images. As shown in FIG. 8, in the game choice image 61, the hand 55 of the roulette image 54 points the player A's region associated with the currently selected mini-game image (an image 63 in FIG. 8) indicating the chosen mini-game, of the regions of the players A-D. Therefore, each player can know the chosen mini-game (and a player corresponding to the mini-game) by viewing the game choice image 61.

After the game choice image has been displayed, the information processing apparatuses 2 start the chosen mini-game. Thereafter, when the mini-game has ended, the information processing apparatuses 2 execute a process of giving each player a prize corresponding to the result of the mini-game, and a process of changing the content sets (step S7 of FIG. 3).

[2-5. Giving Prize]

The process of giving a prize that is executed after the end of a mini-game will be described with reference to FIG. 9. When a mini-game has ended, the information processing apparatuses 2 initially give each player character coins the number of which corresponds to the result of the mini-game as a prize in the game. In this case, the information processing apparatuses 2 display a game result image.

Figure 9:
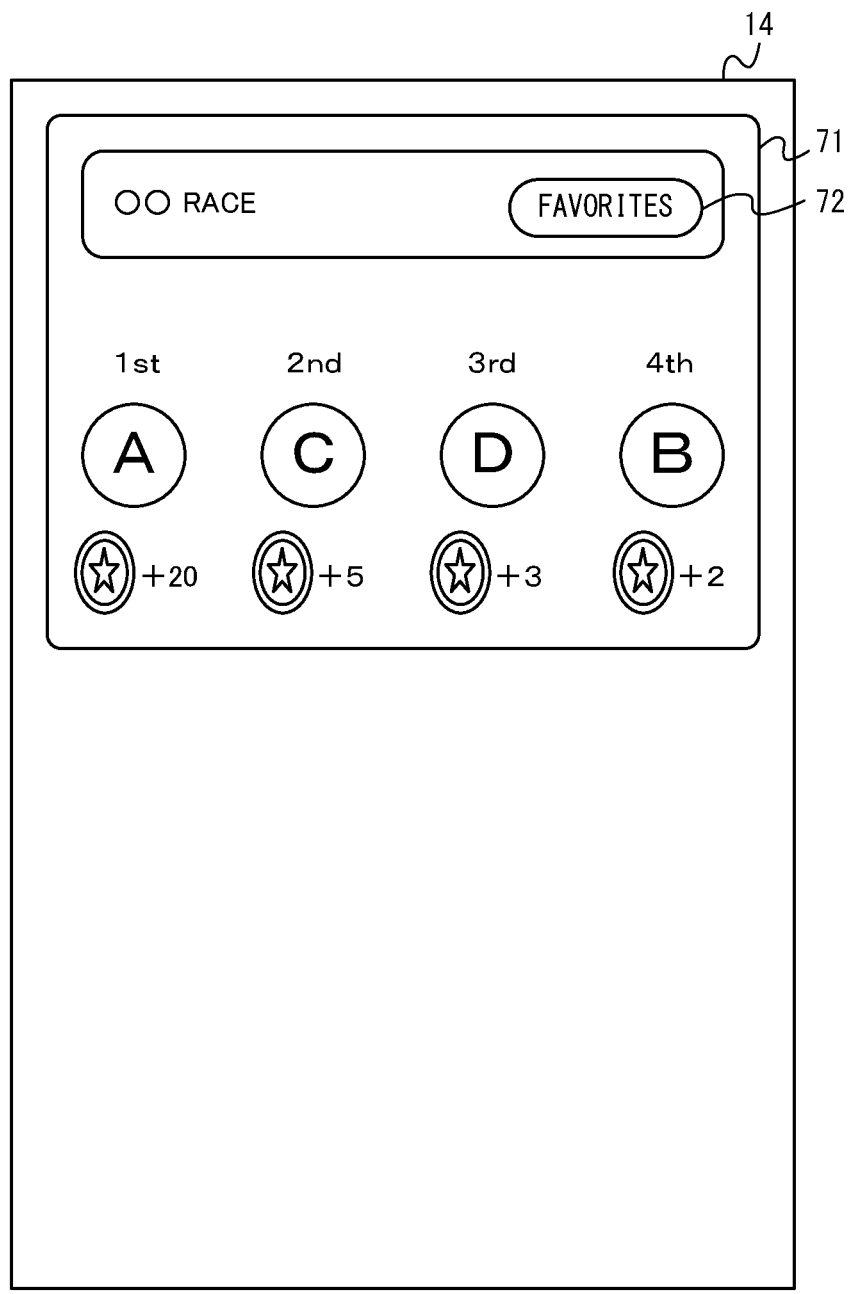
FIG. 9 is a diagram showing a non-limiting example game result image.

FIG. 9 is a diagram showing a non-limiting example of the game result image. A game result image 71 indicates the result of a mini-game (in other words, an achievement of each player), and a prize given to each player that depends on their result of the mini-game. Specifically, as shown in FIG. 9, the game result image 71 indicates the rank of each player in the mini-game, and the number of coins given to each player.

Here, in this non-limiting example embodiment, the number of coins given, depending on the result of a mini-game, is determined according to rules (a) and (b) as follows.

(a) The basic number of coins given to a player who is first in the rankings of the mini-game is 10; a player who is second, 5; a player who is third, 3; and a player who is fourth, 2.

(b) If a mini-game selected by a player has been chosen, the number of coins given to the player is twice as high as the basic number corresponding to the result of the mini-game, and if the mini-game has not been chosen, the basic number of coins corresponding to the result of the mini-game is given to the player.

Note that in the example of FIG. 9, it is assumed that the mini-game selected by the player A has been executed. Therefore, according to the rule (b), the number of coins given to the player A, who is first, is twice (i.e., 20 coins) as high as what is normally given (i.e., 10 coins). Although not shown in FIG. 9, when the game result image 71 is displayed in the upper region of the screen, an image for describing the rules may be displayed in the lower region of the screen. For example, the basic number of coins given to a player at each rank, and the number of coins given to the player if a mini-game selected by the player is executed (twice as high as the basic number), may be displayed in the lower region of the screen.

As described above, in this non-limiting example embodiment, the information processing apparatuses 2 set a predetermined prize given to a player, depending on a certain result (e.g., the player is first in the rankings) such that the prize given when a mini-game selected from the player's content set has been executed (in this non-limiting example embodiment, 20 coins) is greater than the prize given when a mini-game selected from the player's content set has not been executed (in this non-limiting example embodiment, 10 coins). Thus, in this non-limiting example embodiment, concerning a prize that is given, depending on the result of a mini-game, each player is given an incentive to cause a mini-game selected by the player to be chosen and executed. Here, as described above, each player is given an incentive to satisfy the start condition so that a mini-game selected by the player is more likely to be executed. Therefore, each player is given an incentive to satisfy the start condition so that a mini-game selected by themselves is more likely to be executed, and a greater prize depending on the result of the mini-game is won. Thus, in this non-limiting example embodiment, the information processing apparatuses 2 also give each player an incentive to satisfy the start condition, in terms of prize, and therefore, each player is motivated to operate a player character such that the player character lands on a square which causes a mini-game event. As a result, the game proceeds smoothly.

As shown in FIG. 9, in this non-limiting example embodiment, the game result image contains a favorite button 72. Each information processing apparatus 2 adds a mini-game that has been executed to favorites if the respective player presses the favorite button 72. In other words, each player can add a mini-game to favorites by pressing the favorite button in the game result image that is displayed after the mini-game has been played. In this non-limiting example embodiment, an instruction to add a mini-game to favorite can be input in gameplay, and therefore, each player can more easily add a mini-game to favorites. For example, each player can add a mini-game to favorites immediately after the mini-game has been played if the player likes the mini-game. Note that as described above, each player can create a content set including a mini-game added to favorites.

Note that the information processing apparatuses 2 may receive an instruction to add a mini-game to favorites at any suitable timing in gameplay, in addition to immediately after a mini-game has been executed. For example, the information processing apparatuses 2 may receive the addition instruction in the game on the base stage. The information processing apparatuses 2 may also receive the addition instruction during another period of time (e.g., a period of time during which the setting image of FIG. 4 is displayed) in addition to the gameplay period.

[2-6. Changing Content Set]

Referring back to FIG. 3, the content set changing process (step S7 of FIG. 3) will be described. After the end of a mini-game, the information processing apparatuses 2 execute the content set changing process. In this non-limiting example embodiment, the information processing apparatuses 2 delete an executed mini-game from a content set (see FIG. 3). As a result, a player who has the content set can no longer select that mini-game from the content set in the selection process in the event of the next mini-game (step S8). Here, if a player is allowed to select the same mini-game any number of times when multiple rounds of mini-game play are executed in a round of gameplay, the player is likely to repeatedly simply select their favorite mini-game without guessing what kind of a mini-game is to be selected by another player. As a result, the strategic aspects of the game involved in selecting a mini-game are likely to be reduced. In contrast to this, according to this non-limiting example embodiment, a mini-game that has already been executed is deleted from a content set, so that a player can be prevented from selecting the same mini-game any number of times, and therefore, the possibility that the strategic aspects of the game involved in selecting a mini-game is reduced can be reduced.

As described above, in this non-limiting example embodiment, the information processing apparatuses 2 execute a process of deleting a mini-game from a content set as a specific process for excluding a mini-game from those to be selected in the selection process that is subsequently performed. Here, in another non-limiting example embodiment, as the process for excluding a mini-game from those to be selected in the selection process, the information processing apparatuses 2 may execute a process of setting a flag indicating that the mini-game cannot be selected from a content set.

In this non-limiting example embodiment, while the information processing apparatuses 2 delete an executed mini-game from a content set from which the mini-game has been selected, and do not delete the mini-game from the other content sets. For example, in the example of FIG. 3, it is assumed that the mini-game A-1 is the same as the mini-game B-1. In this case, in the example of FIG. 3, the mini-game A-1 has been selected and executed, and therefore the mini-game A-1 is deleted from the player A's content set. Meanwhile, the mini-game B-1 has not been selected, and therefore, the mini-game B-1 is not deleted from the player B's content set. Here, if a mini-game which has not been selected by a player is deleted, the player is likely to complain about the game. In contrast to this, according to this non-limiting example embodiment, a mini-game that has not been selected by a player (even though the same mini-game has been executed) is not deleted from that player's content set, and therefore, the possibility that the player complains about the game can be reduced.

Note that in another non-limiting example embodiment, the information processing apparatuses 2 delete an executed mini-game from a content set from which the mini-game has been selected, and in addition, may delete that mini-game from another content set. As a result, the possibility that the same mini-game is executed any number of times can be reduced, and therefore, the possibility that a player gets bored with the mini-game can be reduced.

In another non-limiting example embodiment, the information processing apparatuses 2 may delete a mini-game that has been selected in the selection process, from a content set. For example, in the example of FIG. 3, the mini-games A-1, B-2, C-4, and D-3 have been selected in the selection process, and therefore, the information processing apparatuses 2 may delete the four mini-games from the respective content sets. Here, if a mini-game that has been selected in the selection process but has not been executed is allowed to be selected by a player in the selection process for the next mini-game, the player can select the same mini-game any number of times (until that mini-game has been executed), and therefore, the strategic aspects of the game involved in selecting a mini-game are likely to be reduced. In contrast to this, if a mini-game that has been selected in the selection process is deleted from a content set, a mini-game that has been selected in the selection process but has not been executed can be prevented from being selected by a player any number of times, and therefore, the possibility that the strategic aspects of the game involved in selecting a mini-game is reduced can be reduced.

In the non-limiting example embodiment in which a mini-game that has been selected in the selection process is deleted from a content set, the information processing apparatuses 2 may delete a mini-game from a content set from which the mini-game has been selected, and may not delete the mini-game from the other content sets. For example, it is assumed that the player A and the player B have set the same mini-game E in the respective content sets. In this case, it is assumed that the player A has selected the mini-game E, and the player B has selected another mini-game, in a certain selection process. In this case, the information processing apparatuses 2 delete the mini-game E from the player A's content set, and do not delete the mini-game E from the player B's content set. Thus, a mini-game that has not yet been selected by a player can be prevented from being deleted from that player's content set because that mini-game has been selected by another player, and therefore, the possibility that the player complains about the game can be reduced.

Note that in this non-limiting example embodiment, the maximum number of mini-games included in each content set is five. Therefore, if five times or more rounds of mini-game play are executed in a round of gameplay, there is the possibility that no mini-games remain in the content set of one of the players. In this case, the information processing apparatuses 2 reset the content set of a player that includes no remaining mini-games, in the content set changing process. Note that the method for resetting a content set is not particularly limited. For example, the same content set as the original one may be set again by the information processing apparatuses 2. For example, the information processing apparatuses 2 may allow each player to freely reset a content set using a process similar to the content set setting process (step S1), which is executed before the start of the game.

In this non-limiting example embodiment, the content set changing process is executed as gameplay proceeds (specifically, each time a mini-game is executed). Here, in another non-limiting example embodiment, the content set changing process may be executed at another timing as gameplay proceeds. For example, the information processing apparatuses 2 execute the content set changing process when an event occurs on the base stage. Note that the event may, for example, occur when a player character lands on a specific square, or when a player character uses a specific item. Thus, the content set changing process may be executed at any suitable timing during a round of gameplay. Because a content set that has been set before the start of gameplay is thus changed in gameplay, each player plays the game, taking into account the contents of the content set changed in gameplay. Therefore, the strategic aspects of the game can be more improved.

[3. Specific Non-Limiting Examples of Information Process]

Next, specific non-limiting examples of the information process in the information processing apparatuses 2 will be described with reference to FIGS. 10-13.

[3-1. Data for Use in Information Process]

Figure 10:
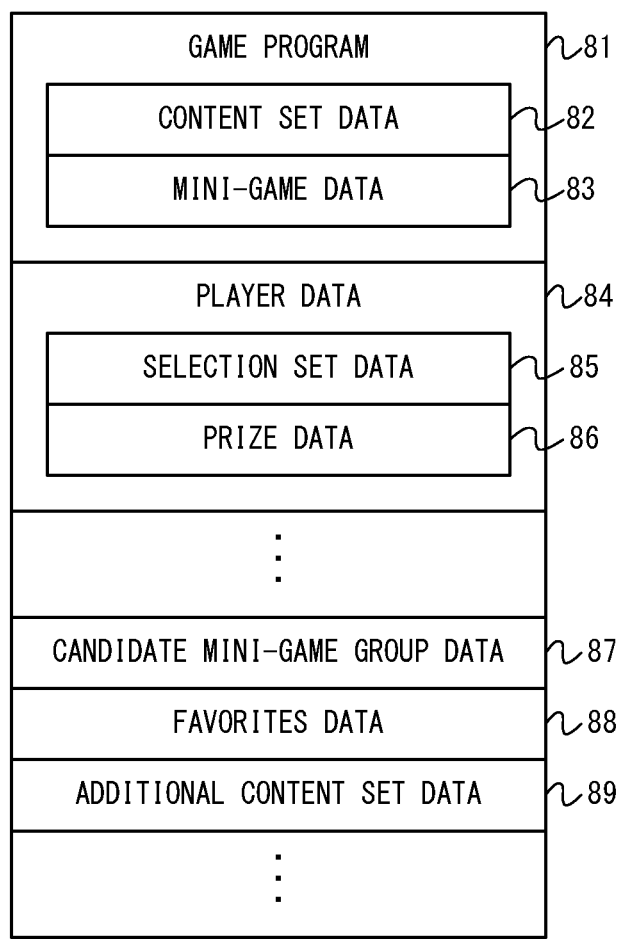
FIG. 10 is a diagram showing a non-limiting example of various items of data that are used in an information process in an information processing apparatus.

FIG. 10 is a diagram showing a non-limiting example of various items of data for use in the information process of the information processing apparatuses 2. The various items of data of FIG. 10 are stored in a memory of the processing unit 11 or the storage unit 12 of each information processing apparatus 2.

As shown in FIG. 10, the information processing apparatuses 2 store a game program 81. The game program 81 is for executing the game in this non-limiting example embodiment, and is stored in, for example, the storage unit 12. The game program 81 contains content set data 82 and mini-game data 83.

The content set data 82 indicates a plurality of previously prepared content sets in the game program (i.e., contained in the game program or supplied together with the game program when the game program is installed in the information processing apparatuses 2). Specifically, the content set data 82 indicates mini-games included in each content set. For example, the content set data 82 indicates information in which identification information of each content set (e.g., an ID or title of each content set), and identification information of each mini-game included in the content set, are associated with each other.

The mini-game data 83 is for executing a game process for a plurality of previously prepared mini-games in the game program (in other words, mini-games executable in the game). For example, the mini-game data 83 contains programs for executing the respective mini-games, and data for use in the mini-games (e.g., data of objects appearing in the mini-games), etc.

Figure 11:
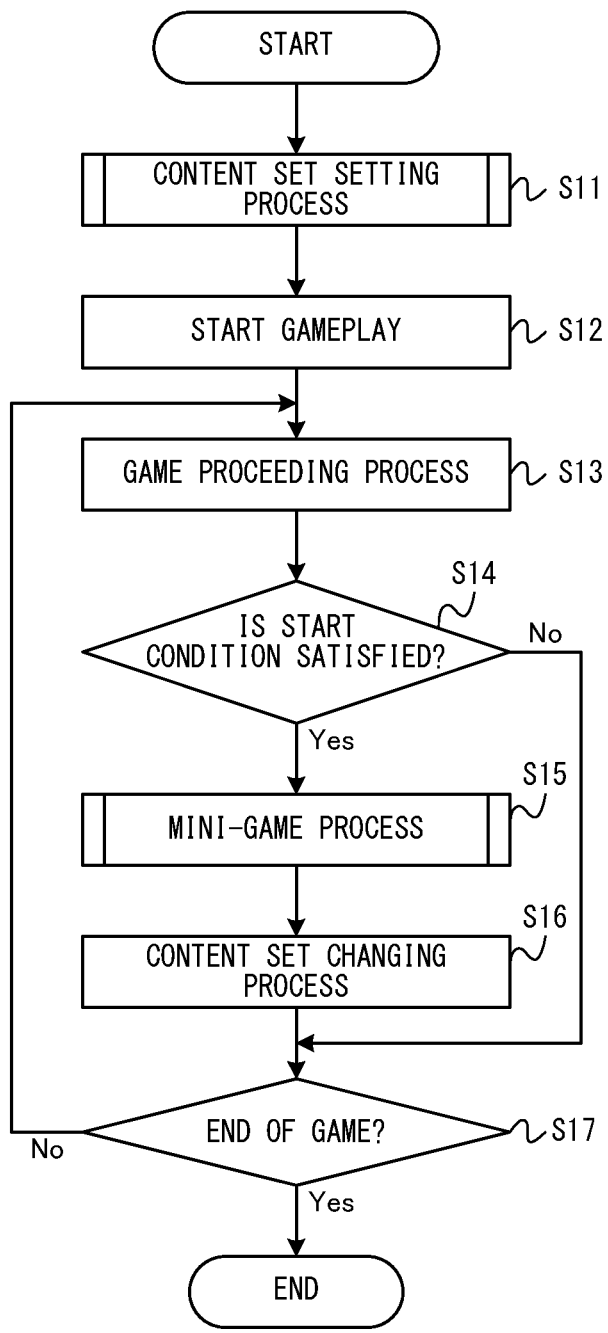
FIG. 11 is a flowchart showing a non-limiting example flow of an information process that is executed by an information processing apparatus.
Figure 12:
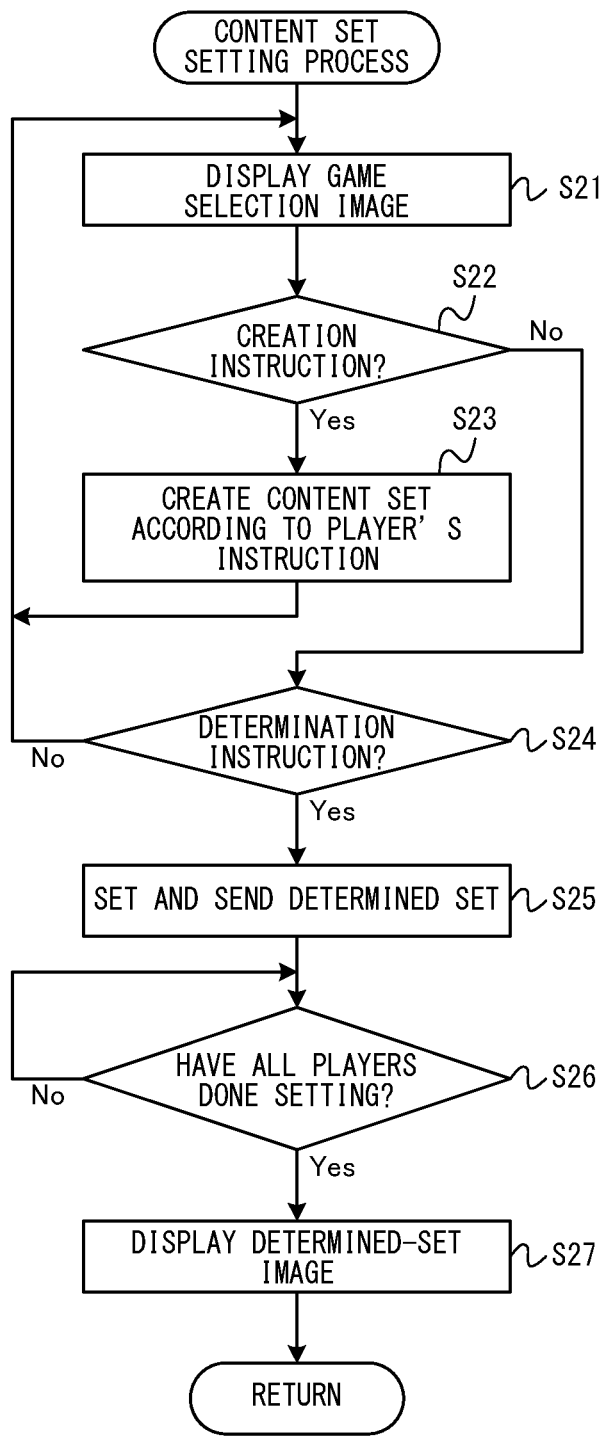
FIG. 12 is a sub-flowchart showing a non-limiting example detailed flow of a content set setting process in step S11 of FIG. 11.
Figure 13:
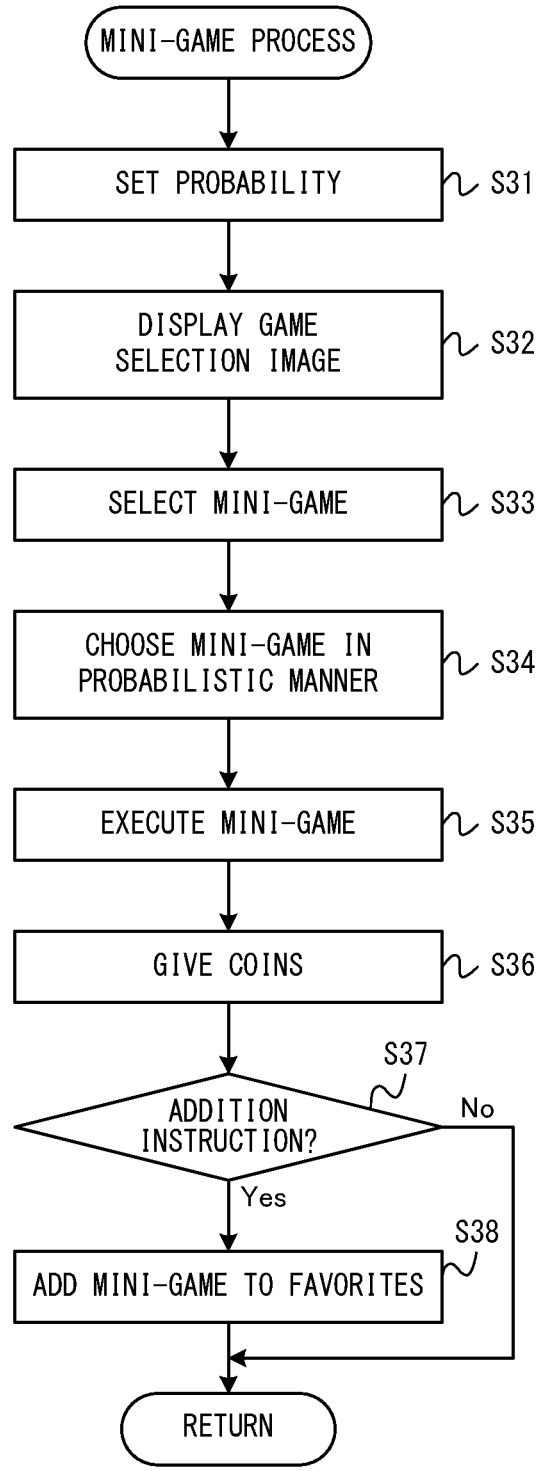
FIG. 13 is a sub-flowchart showing a non-limiting example detailed flow of a mini-game process in step S15 of FIG. 11.

As shown in FIG. 10, the information processing apparatuses 2 also store player data 84, candidate mini-game group data 87, favorites data 88, and additional content set data 89. These items of data are generated and used in an information process described below (FIGS. 11-13).

The player data 84 indicates various items of information related to a player that have been set in the game. Specifically, the player data 84 contains selection set data 85 and prize data 86. The selection set data 85 indicates a content set for the player that has been set in the content set setting process (step S1 in FIG. 3) before the start of gameplay. The prize data 86 indicates a prize (specifically, the number of coins given) that has been given to a player in gameplay. Although not shown, the player data 84 stores data for all players participating in the game.

The candidate mini-game group data 87 indicates the candidate mini-game group generated in the mini-game process (step S3 in FIG. 3). Specifically, the candidate mini-game group data 87 indicates the identification information of each mini-game included in candidate mini-game group.

The favorites data 88 indicates a mini-game(s) added to favorites in the corresponding information processing apparatus 2 (i.e., the information processing apparatus 2 containing that favorites data 88).

The additional content set data 89 indicates a content set that has been newly created by the player of the corresponding information processing apparatus 2 in the content set setting process before the start of gameplay (step S1 of FIG. 3).

[3-2. Process Executable in Information Processing Apparatus]

FIG. 11 is a flowchart showing a non-limiting example flow of an information process executable in the information processing apparatuses 2. Note that the information process of FIG. 11 is started if a predetermined condition is satisfied (e.g., a player has input an instruction to play a game) after the start of the game program stored in the storage unit 12.

Note that in this non-limiting example embodiment, it is assumed that the steps of FIGS. 11-13 are executed by a CPU (in other words, a processor) of the processing unit 11 of each information processing apparatus 2 executing the game program stored in the storage unit 12. Note that in another non-limiting example embodiment, a portion of the steps may be executed by a processor (e.g., a dedicated circuit, etc.) other than the CPU. In the case where the information processing apparatuses 2 can communicate with a server, a portion of the steps of FIGS. 11-13 may be executed by the server. The steps of FIGS. 11-13 are merely illustrative, and if a similar result is obtained, the order in which the steps are executed may be changed, and another step may be executed in addition to or instead of each step.

The processing unit 11 of each information processing apparatus 2 executes the steps of FIGS. 11-13 using a memory (or the storage unit 12). Specifically, the CPU of the processing unit 11 stores data obtained in each step in the memory, and if necessary, reads the data from the memory and uses the data in a subsequent step.

In step S11 of FIG. 11, the processing unit 11 executes the content set setting process (step S1 of FIG. 3). The content set setting process will now be described in detail with reference to FIG. 12.

FIG. 12 is a sub-flowchart showing a non-limiting example detailed flow of the content set setting process of step S11 of FIG. 11. In the content set setting process, initially, in step S21, the processing unit 11 displays the setting image (see FIG. 4) on the display unit 14. When the setting image is being displayed, the processing unit 11 receives an instruction input from the player. Thus, the processing unit 11 obtains data indicating an input to the input unit 13, from the input unit 13. Following step S21, step S22 is executed.

In step S22, the processing unit 11 determines whether or not an instruction to create a content set has been input by the player. Specifically, the processing unit 11 determines whether or not the creation button 27 (see FIG. 4) has been pressed, based on the data obtained from the input unit 13. If the determination result of step S22 is positive, step S23 is executed. Otherwise, step S24 is executed.

In step S23, the processing unit 11 creates a content set according to the player's instruction. Specifically, the processing unit 11 executes the process of displaying the set creation image, the process of determining the player's instruction based on the data obtained from the input unit 13, etc., to create a content set corresponding to the player's instruction, using the method described above in "[2-2. Setting Content Set]." As described above, in this non-limiting example embodiment, the processing unit 11 creates (a) a content set including mini-games specified by the player, (b) a content set including mini-games randomly selected by the processing unit 11, and/or (c) a content set including favorite mini-games. Note that the processing unit 11 stores data indicating the created content set(s) as the additional content set data 89 in the memory. Following step S23, step S21 is executed again.

Note that in this non-limiting example embodiment, each information processing apparatus 2, when a content set has been newly created in itself, stores its own additional content set data 89 indicating the content set, and when a content set has been newly created in another information processing apparatus 2, does not store its own additional content set data 89. Here, in another non-limiting example embodiment, each information processing apparatus 2, when a new content set has been created in another information processing apparatus 2, may store its own additional content set data 89. In this case, each information processing apparatus 2 may manage (in other words, store) the additional content set data 89 for each player separately.

In step S24, the processing unit 11 determines whether or not the player has input an instruction to determine a content set that is to be used in the game. Specifically, the processing unit 11 determines whether or not the determination button 26 (see FIG. 4) has been pressed, based on the data obtained from the input unit 13. If the determination result of step S24 is positive, step S25 is executed. Otherwise, step S21 is executed again.

In step S25, the processing unit 11 sets a content set according to the determination instruction, as a content set that is to be used by the player, and sends the set information indicating the content set to the other information processing apparatuses 2. The processing unit 11 stores data indicating the content set corresponding to the determination instruction, as the selection set data 85, into the memory. The processing unit 11 also sends data of the set information to the other information processing apparatuses 2 using the communication unit 15 (in other words, via the communication unit 15). Following step S25, step S26 is executed.

In step S26, the processing unit 11 determines whether or not a content set has been set for all players participating in the game. Here, although not shown, in the content set setting process, each information processing apparatus 2 communicates with the other information processing apparatuses 2, and receives data of the set information from the other information processing apparatuses at suitable timings. The processing unit 11, when receiving data of the set information from another information processing apparatus 2, stores data of a content set indicated by the set information, as the selection set data 85 of the player of that information processing apparatus 2 as a sender, into the memory. In step S26, the processing unit 11 performs the above determination by referring to the selection set data 85 stored in the memory. Note that step S26 is executed every predetermined period of time (e.g., every frame period). If the determination result of step S26 is positive, step S27 is executed. Otherwise, step S26 is executed again.

In step S27, the processing unit 11 displays the determined-set image (see FIG. 5) on the display unit 14. Specifically, the processing unit 11 generates and displays a determined-set image indicating the content sets of the players using the selection set data 85 of each player stored in the memory. When the determined-set image is being displayed, the processing unit 11 receives an instruction input from the player, and determines whether or not the game start button 35 (see FIG. 5) has been pressed, based on data obtained from the input unit 13. If the game start button 35 has been pressed, the processing unit 11 sends data indicating that an instruction to start the game has been input by the player of the corresponding information processing apparatus 2, to the other information processing apparatuses 2, using the communication unit 15. If all players participating in the game have input an instruction to start the game, the processing unit 11 ends step S27 and the content set setting process.

Referring back to FIG. 11, following the content set setting process of step S11, step S12 is executed. In step S12, the processing unit 11 starts gameplay. Specifically, the processing unit 11 sets initial values of various items of data for use in the game process (steps S13-S16) in gameplay, and constructs a game space (e.g., the base stage) before starting the game. Following step S12, step S13 is executed.

In step S13, the processing unit 11 executes a process of causing the game to proceed. In this non-limiting example embodiment, the processing unit 11 executes, for example, a process of controlling a player character on the base stage, a process of executing an event (here, an event other than a mini-game) corresponding to a square on which the player character lands, etc. The processing unit 11 also displays a game image indicating the results of these processes on the display unit 14. Note that step S13 is repeatedly performed at a rate of once per frame period. Following step S13, step S14 is executed.

In step S14, the processing unit 11 determines whether or not the start condition for starting a mini-game is satisfied. In this non-limiting example embodiment, the processing unit 11 determines whether or not a player character has landed on a square having a balloon on the base stage. If the determination result of step S14 is positive, step S15 is executed. Otherwise, steps S15 and S16 are skipped, and step S17 described below is executed.

In step S15, the processing unit 11 executes the mini-game process (step S3 of FIG. 3). The mini-game process will be described in detail with reference to FIG. 13.

FIG. 13 is a sub-flowchart showing a non-limiting example detailed flow of the mini-game process of step S15 of FIG. 11. In the mini-game process, initially, in step S31, the processing unit 11 sets a probability with which each of mini-games selected by all the players is chosen. Here, at the time of step S15, none of the players has yet specified a mini-game. However, in this non-limiting example embodiment, the probability is set based on a player who has satisfied the start condition. Therefore, the probability can be set at the time of step S15. Specifically, the processing unit 11 adjusts the probability with which a mini-game corresponding to a player who has satisfied the start condition is chosen such that this probability is higher than the probability with which a mini-game corresponding to another player is chosen, as described above in "[2-4-1. Selecting Mini-game]." Following step S31, step S32 is executed.

In step S32, the processing unit 11 displays the game selection image (see FIG. 7) on the display unit 14. In this case, the roulette image 54 contained in the game selection image is generated such that the area of the region (in other words, the central angle of the circular sector) of each player in the roulette image 54 corresponds to the respective probability set in step S31. Following step S32, step S33 is executed.

In step S33, the processing unit 11 selects a mini-game from each of the content sets of all the players (step S4 of FIG. 3). Specifically, the processing unit 11 selects, from the content set of each player, a mini-game specified by the player, using the method described above in "[2-4-1. Selecting Mini-game]." The processing unit 11 also creates the candidate mini-game group including the selected mini-games. Specifically, the processing unit 11 creates and stores the candidate mini-game group data 87 indicating identification information of each mini-game into the memory. Following step S33, step S34 is executed.

In step S34, the processing unit 11 chooses a mini-game from the candidate mini-game group with the probability set in step S31. In this case, the processing unit 11 indicates the above scene using the roulette image 54 before displaying the game choice image (see FIG. 8) on the display unit 14. Following step S34, step S35 is executed.

In step S35, the processing unit 11 executes the chosen mini-game. Specifically, the processing unit 11 executes the game process for the chosen mini-game using the mini-game data 83 stored in the storage unit 12. After the end of the mini-game, the processing unit 11 ends step S35, and executes step S36.

In step S36, the processing unit 11 gives coins to each player, depending on the result of the mini-game. Specifically, the processing unit 11 calculates the number of coins that is to be given to each player using the method described above in "[2-5. Giving Prize]," and displays the game result image (see FIG. 9) on the display unit 14. In this case, the processing unit 11 updates the prize data 86 in the player data 84 of each player that is stored in the memory, using the number of coins given. Following step S36, step S37 is executed.

In step S37, the processing unit 11 determines whether or not an instruction to add (or register) a mini-game to favorites (also referred to as an "addition instruction" or "registration instruction") has been input. Specifically, when the game result image is being displayed, the processing unit 11 is allowed to receive an instruction input from the player, i.e., determines whether or not the favorite button 72 (see FIG. 9) has been pressed. If the favorite button 72 has been pressed during that period of time, the processing unit 11 determines that the addition instruction has been input. If the favorite button 72 has not been pressed during that period of time, the processing unit 11 determines that the addition instruction has not been input. Note that the display of the game result image is ended when a predetermined period of time has elapsed since the start of the display of the game result image, or when the player has input an instruction to end the mini-game process. If the determination result of step S37 is positive, step S38 is executed. Otherwise, the processing unit 11 skips step S38, and ends the mini-game process.

In step S38, the processing unit 11 adds the mini-game that has been executed in the current mini-game process to favorites. Specifically, the processing unit 11 stores data indicating the mini-game as the favorites data 88 into the memory. After the end of step S38, the processing unit 11 ends the mini-game process.

Note that in this non-limiting example embodiment, each information processing apparatus 2, when the respective player has input an instruction to add a mini-game to favorites, adds the mini-game to favorites, and when another player has input an instruction to add a mini-game to favorites, does not add the mini-game to favorites. Here, in another non-limiting example embodiment, each information processing apparatus 2, when the player of another information processing apparatus 2 has input an instruction to add a mini-game to favorites, may also add the mini-game to favorites. In this case, each information processing apparatus 2 may manage (in other words, store) favorite mini-games for each player separately.

Referring back to FIG. 11, following the mini-game process of step S15, step S16 is executed. In step S16, the processing unit 11 executes the content set changing process. Specifically, the processing unit 11 changes mini-games included in a content set (specifically, deletes a mini-game or resets a content set) using the method described above in "[2-6. Changing Content Set]." Specifically, the processing unit 11 updates the selection set data 85 stored in the memory such that the selection set data 85 indicates the changed contents of a content set. Following step S16, step S17 is executed.

In step S17, the processing unit 11 determines whether or not to end the game (in other words, ends a round of gameplay). Specifically, the processing unit 11 determines whether or not the above end condition is satisfied. If the determination result of step S17 is negative, step S13 is executed again. Thereafter, steps S13-S17 are repeated until the processing unit 11 has determined to end the game. Meanwhile, if the determination result of step S17 is positive, the processing unit 11 ends the information process of FIG. 11. Note that in this case, the processing unit 11 may display an image indicating the result of the game on the display unit 14 before the end of the game.

[4. Advantages and Variations of this Non-Limiting Example Embodiment]

According to the above non-limiting example embodiment, the information processing apparatuses 2 have the following features:

a set setting means (step S1/step S11) for executing the process of setting a content set including a plurality of game contents (in this non-limiting example embodiment, mini-game contents) for each of a plurality of players;

a content selecting means (step S4/step S33) for executing the process of selecting at least one game content from each of a plurality of content sets;

a content choosing means (step S5/step S34) for choosing, according to a predetermined rule, a game content from a game content group (in this non-limiting example embodiment, a candidate mini-game group) including a plurality of game contents selected by the selection process being executed for each content set; and a game executing means (step S6/step S35) for executing a game process based on a chosen game content.

In this non-limiting example embodiment, the "plurality of game contents" are a plurality of mini-game contents (in other words, data for executing mini-games). The present disclosure is not limited to this. The "plurality of game contents" may be contents that are different from each other in at least one of (a) game rule, (b) game condition (e.g., game difficulty level), and (c) game stage (e.g., fighting stage in a fighting game, or course in a racing game).

The set setting means may execute the setting process for a single player who uses a single information processing apparatus, or for each of a plurality of players. The content selecting means may execute the selection process for a single player, or each of a plurality of players (in other words, each content set). Note that when the setting process and the selection process are executed for only a single player, the content choosing means may receive information of game contents selected from the other content sets (i.e., content sets specified by the other players) from the other information processing apparatuses to obtain information of each game content included in the game content group.

The above "predetermined rule" is not particularly limited. As in the above non-limiting example embodiment, the predetermined rule may be defined to choose a game content substantially randomly. Alternatively, the predetermined rule may be defined not to choose a game content substantially randomly (i.e., the same game content is chosen a plurality of times). Still alternatively, the predetermined rule may be defined to "choose a mini-game that has been selected by a player at the current lowest rank."

(Variations of Setting Content Set)

In this non-limiting example embodiment, a content set for a player is specified by the player themselves. Therefore, there are tactics for selecting a content set (step S1), so that the strategic aspects of the game can be improved. Note that in another non-limiting example embodiment, a content set for a player may not be specified by the player themselves. For example, the information processing apparatuses 2 may determine a content set for a player from a plurality of previously prepared content sets, randomly (or according to a predetermined rule). Note that even in such an embodiment, there are tactics for specifying a mini-game from a content set (step S4), and therefore, as in this non-limiting example embodiment, the strategic aspects of the game can be improved. Thus, the information processing apparatuses 2 execute at least one of the content set setting process (step S1) and the process of selecting a mini-game from a content set (step S4), according to each player's instruction, and therefore, each player's intention can be reflected on the selection of mini-games. Therefore, there are tactics for selecting a mini-game.

(Variations of Game Genre)

In this non-limiting example embodiment, the game executable by the game program is one in which players perform multiple rounds of mini-game play, and contend for ranks based on the results of the multiple rounds of mini-game play. The genre of the game is not particularly limited. For example, in another non-limiting example embodiment, the game executable by the game program may be a racing game. In this case, each player sets a content set including a plurality of racing courses, and selects a racing course from the content set before the start of a race. Thereafter, the information processing apparatuses 2 choose one from the racing courses selected by all the players, and executes a game process for the raging game using the chosen racing course. In this case, there are tactics for selecting a racing course, and the amusingness of the racing game can be improved.

Alternatively, for example, the game executable by the game program may be a fighting game in which player characters fight against each other. In this case, each player sets a content set including a plurality of stages, and selects a stage from the content set before the start of a fighting. Thereafter, the information processing apparatuses 2 choose one from the stages selected by all the players, and executes a game process for the fighting game using the chosen stage. In this case, there are tactics for selecting a fighting stage, and the amusingness of the fighting game can be improved.

Alternatively, for example, in another non-limiting example embodiment, the game executable by the game program may not include the base stage of this non-limiting example embodiment, and in the game, selecting a mini-game (step S4 of FIG. 3), choosing a mini-game (step S5 of FIG. 3), and executing a mini-game (step S5 of FIG. 3) may be repeatedly executed.

The above non-limiting example embodiments are applicable to, for example, game programs, game apparatuses, etc., in order to improve the strategic aspects of a game involved in selecting a game content for use in the game.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program, the game program causing a computer to execute:
   setting, for a first player, a first content set including a first plurality of games that are different from each other in at least one of game rule, game condition, and game stage;
   selecting a first game from the first content set;
   identifying a second content set including a second plurality of games, the second plurality of games including the first game and at least one additional game selected from at least one additional content set of at least one additional player;
   choosing, according to a rule, a game for execution by the first player and the at least one additional player from the second content set;
   performing a game process based on the chosen game; and
   changing a game content included in at least one of the first content set and the at least one additional content set, wherein the changing includes excluding the chosen game from the first content set in a case that the chosen game is included in the first content set, and excluding the chosen game from the at least one additional content set in a case that the chosen game is included in the at least one additional content set.

2. The storage medium according to claim 1, wherein excluding the chosen game includes excluding the chosen game from one of the first content set or the at least one additional content set from which the chosen game content has been selected, and not excluding the chosen content from content sets other than the one of the first content set or the at least one additional content set from which the chosen game has been selected.

3. The storage medium according to claim 1, wherein the changing includes excluding the at least one game from the first content set in the selecting, if one or more conditions including one that the at least one game has been selected in the selecting are satisfied.

4. The storage medium according to claim 3, wherein the excluding includes not excluding the at least one game from content sets other than the first content set.

5. The storage medium according to claim 1, wherein the selecting includes selecting the at least one game from the first content set according to an instruction from a player.

6. The storage medium according to claim 1, wherein the setting includes setting, as the first content set for the first player, a content set specified by the first player from a plurality of previously prepared content sets.

7. The storage medium according to claim 1, wherein the game program causes the computer to further execute:
   creating the first content set including the first plurality of games specified by the first player from a plurality of previously prepared games, and the setting includes setting, as the first content set for the first player, the created first content set including the first plurality of game contents specified by the first player.

8. The storage medium according to claim 1, wherein the game program causes the computer to further execute:
receiving, from the first player, an instruction to automatically create the first content set; and
creating the first content set including the first plurality of games automatically selected from a plurality of previously prepared game contents, and
the setting includes setting, as the first content set for the first player, the first content set including the first plurality of games automatically selected according to an instruction of the player.

9. The storage medium according to claim 1, wherein the selecting, the identifying, the choosing, and performing the game process based on the chosen game is repeatedly executed as gameplay proceeds during a round of gameplay, and
the game program causes the computer to further execute:
receiving a registration instruction to register a new game, which is different from the first plurality of games, executed in the gameplay, from the first player, at a timing during the round of gameplay; and
creating an additional content set, which is different from the first content set, including the new game for which the registration instruction has been received, and
the setting includes setting the additional content set instead of the first content set as the content set for the first player.

10. The storage medium according to claim 1, wherein the game program causes the computer to further execute;
giving a prize in a game to at least one of the first player and the at least one additional player according to a result of the game process based on the chosen game content, and
the prize given to the at least one of the first player and the at least one additional player according to the result is greater when the chosen game content is from a content set of the player that is given the prize than when the chosen game content is not from a content set of the player that is given the prize.

11. The storage medium according to claim 1, wherein the game program causes the computer to further execute:
presenting, to a first player of the first player and the at least one additional player, a player a setting image indicating game contents included in a content set corresponding to another player of the first player and the at least one additional player.

12. A non-transitory computer-readable storage medium having stored therein a game program, the game program causing a computer to execute:
setting, for a first player, a first content set including a first plurality of game contents different from each other in at least one of game rule, game condition, and game stage, for a player;
selecting at least a first game content from the first content set;
identifying a second content set including a second plurality of game contents, the second plurality of game contents including the first game content and at least one additional game content selected from at least one additional content set of at least one additional player;
choosing, according to a rule, a game content for execution by at least the first player and the at least one additional player from the second content set; and
performing a game process based on the chosen game content, wherein
the choosing includes choosing, as the chosen game content, one of the second plurality of game contents from the second plurality of game contents in a probabilistic manner.

13. The storage medium according to claim 12, wherein the choosing includes adjusting a probability with which one of the second plurality of game contents satisfying a condition is chosen such that the probability is higher than a probability with which another of the second plurality of game contents included in the second plurality of game contents not satisfying the condition is chosen.

14. The storage medium according to claim 13, wherein the condition is for starting a series of processes including the selecting, the identifying, the choosing, and performing the game process based on the chosen game content, during a round of gameplay, and
in a case where the series of processes is executed if the condition is satisfied, the probability with which one of the second plurality of game contents selected from the first content set or the at least one additional content set of the first player or the at least one additional player satisfying the condition is chosen is adjusted to be higher than the probability with which another of the second plurality of game contents included in the first content set or the at least one additional content set of the first player or the at least one additional player not satisfying the condition is chosen, in the series of processes.

15. The storage medium according to claim 12, wherein the game program causes the computer to further execute:
displaying, on a display device, an image having regions associated with the respective second plurality of game contents, the area of each region representing a probability with which the corresponding game content is chosen.

16. An information processing apparatus including one or more processors, wherein the one or more processors of the information processing apparatus execute:
setting, for a first player, a first content set including a first plurality of game contents different from each other in at least one of game rule, game condition, and game stage, for a player of the information processing apparatus;
selecting at least a first game content from the first content set;
identifying a second content set including a second plurality of game contents, the second plurality of game contents including the first game content and at least one additional game content selected from at least one additional content set of at least one additional player;
choosing, according to a rule, a game content for execution by at least the first player and the at least one additional player from the second content set;
performing a game process based on the chosen game content; and
changing a game content included in at least one of the first content set and the at least one additional content set, wherein the changing includes excluding the chosen game from the first content set in a case that the chosen game is included in the first content set, and excluding the chosen game from the at least one additional content set in a case that the chosen game is included in the at least one additional content set.

17. An information processing system including one or more processors, wherein the one or more processors of the information processing system execute:
   setting, for a first player, a first content set including a first plurality of game contents different from each other in at least one of game rule, game condition, and game stage;
   selecting at least a first game content from the first content set;
   identifying a second content set including a second plurality of game contents, the second plurality of game contents including the first game content and at least one additional game content selected from at least one additional content set of at least one additional player;
   choosing, according to a rule, a game content for execution by at least the first player and the at least one additional player from the second content set;
   performing a game process based on the chosen game content; and
   changing a game content included in at least one of the first content set and the at least one additional content set, wherein the changing includes excluding the chosen game from the first content set in a case that the chosen game is included in the first content set, and excluding the chosen game from the at least one additional content set in a case that the chosen game is included in the at least one additional content set.

18. A game processing method executable in a game system, comprising:
   setting, for a first player, a first content set including a first plurality of game contents different from each other in at least one of game rule, game condition, and game stage, for a player of the information processing apparatus;
   selecting at least a first game content from the first content set;
   identifying a second content set including a second plurality of game contents, the second plurality of game contents including the first game content and at least one additional game content selected from at least one additional content set of at least one additional player;
   choosing, according to a rule, a game content for execution by at least the first player and the at least one additional player from the second content set;
   performing a game process based on the chosen game content; and
   changing a game content included in at least one of the first content set and the at least one additional content set, wherein the changing includes excluding the chosen game from the first content set in a case that the chosen game is included in the first content set, and excluding the chosen game from the at least one additional content set in a case that the chosen game is included in the at least one additional content set.

* * * * *